(12) United States Patent
Yamamoto et al.

(10) Patent No.: US 7,040,433 B2
(45) Date of Patent: May 9, 2006

(54) DRIVE CONTROL APPARATUS FOR HYBRID VEHICLE

(75) Inventors: Kazuhisa Yamamoto, Utsunomiya (JP); Nobuhiro Kira, Utsunomiya (JP); Masao Kubodera, Tochigi-ken (JP); Yusuke Tatara, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 300 days.

(21) Appl. No.: 10/744,011

(22) Filed: Dec. 24, 2003

(65) Prior Publication Data

US 2004/0134698 A1 Jul. 15, 2004

(30) Foreign Application Priority Data

Dec. 26, 2002 (JP) .............................. 2002-377864

(51) Int. Cl.
*B60K 41/02* (2006.01)
(52) U.S. Cl. .................................................. 180/65.2
(58) Field of Classification Search .............. 180/65.2, 180/65.3, 65.4, 65.5, 65.6; 318/139; 903/940, 903/942; 477/6, 5, 8, 11, 906
See application file for complete search history.

(56) References Cited

U.S. PATENT DOCUMENTS

| | | | |
|---|---|---|---|
| 6,524,217 B1 * | 2/2003 | Murakami et al. ............. | 477/5 |
| 6,545,372 B1 | 4/2003 | Hanyu et al. | |
| 6,569,055 B1 * | 5/2003 | Urasawa et al. ............... | 477/5 |
| 6,655,485 B1 | 12/2003 | Ito et al. | |
| 6,684,970 B1 * | 2/2004 | Gotou ........................ | 180/65.2 |
| 2002/0023789 A1 * | 2/2002 | Morisawa et al. ........ | 180/65.2 |
| 2002/0094908 A1 | 7/2002 | Urasawa et al. | |
| 2002/0139592 A1 * | 10/2002 | Fukasaku et al. .......... | 180/65.2 |
| 2004/0040758 A1 * | 3/2004 | Shimizu ..................... | 180/65.2 |
| 2004/0040759 A1 * | 3/2004 | Shimizu et al. ............ | 180/65.2 |
| 2004/0040760 A1 * | 3/2004 | Kadota ...................... | 180/65.2 |
| 2004/0040817 A1 * | 3/2004 | Shimizu et al. ......... | 192/103 R |
| 2004/0104059 A1 * | 6/2004 | Yamamoto et al. ........ | 180/65.2 |
| 2004/0135527 A1 * | 7/2004 | Tatara et al. ................ | 318/139 |
| 2004/0147366 A1 * | 7/2004 | Aoki et al. ..................... | 477/6 |
| 2004/0238244 A1 * | 12/2004 | Amanuma et al. ......... | 180/65.2 |
| 2005/0061567 A1 * | 3/2005 | Kim .............................. | 180/243 |
| 2005/0103551 A1 * | 5/2005 | Matsuno ....................... | 180/243 |
| 2005/0115755 A1 * | 6/2005 | Sakai et al. .................. | 180/243 |
| 2005/0139401 A1 * | 6/2005 | Fujioka ....................... | 180/65.2 |
| 2005/0178592 A1 * | 8/2005 | Yamamoto et al. ........ | 180/65.2 |

FOREIGN PATENT DOCUMENTS

DE 101 02 170 A1 8/2001

(Continued)

*Primary Examiner*—J. Allen Shriver
(74) *Attorney, Agent, or Firm*—Arent Fox, PLLC

(57) ABSTRACT

A rotational shaft receives drive power from an engine and a first motor, and drives front wheels through front clutches. A second motor drives rear wheels. The first motor and the second motor are supplied with electric power from a battery. A main ECU controls an electric vehicle mode in which the first clutches are disengaged, the supply of fuel to the engine is stopped, and the second motor drives the rear wheels to propel a hybrid vehicle, by dividing the electric vehicle mode into a first propulsion mode and a second propulsion mode. In the first propulsion mode, the first motor is de-energized. In the second propulsion mode, a load imposed on the second motor is greater than that of the first propulsion mode, and the first motor is supplied with electric power to rotate the rotational shaft at a predetermined speed.

13 Claims, 17 Drawing Sheets

FOREIGN PATENT DOCUMENTS

| | | |
|---|---|---|
| EP | 1 221 394 A1 | 7/2002 |
| EP | 1 236 604 A2 | 9/2002 |
| JP | 7-115709 | 5/1995 |
| JP | 07-115709 | 5/1995 |
| JP | 09-284911 | 10/1997 |
| JP | 10-136508 | 5/1998 |
| JP | 11-208297 | 8/1999 |
| JP | 2973797 | 9/1999 |
| JP | 2001-112114 | 4/2001 |
| JP | 2001-112118 | 4/2001 |
| JP | 2002-201972 | 7/2002 |
| JP | 2002-213266 | 7/2002 |
| JP | 2002-256913 | 9/2002 |

* cited by examiner

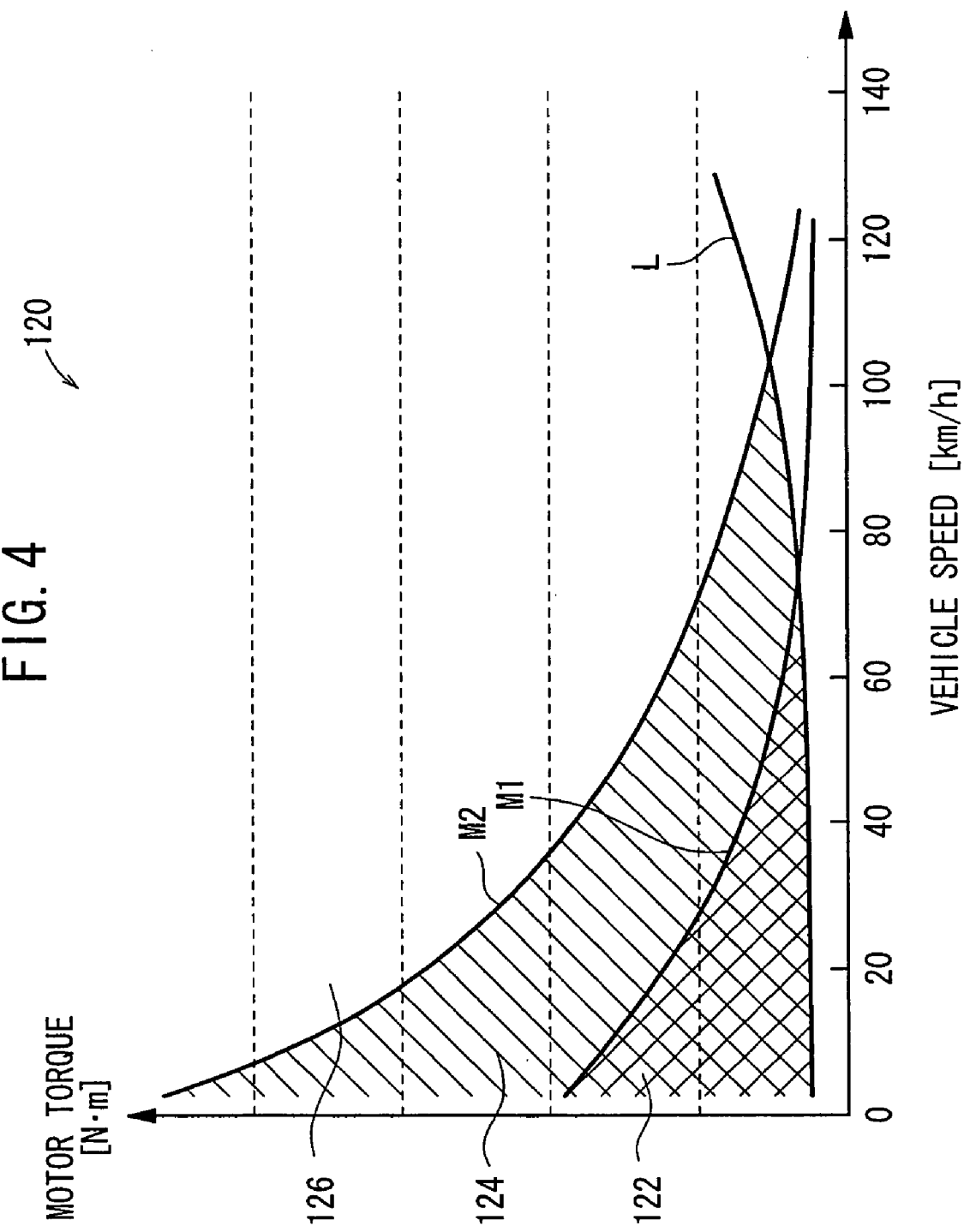

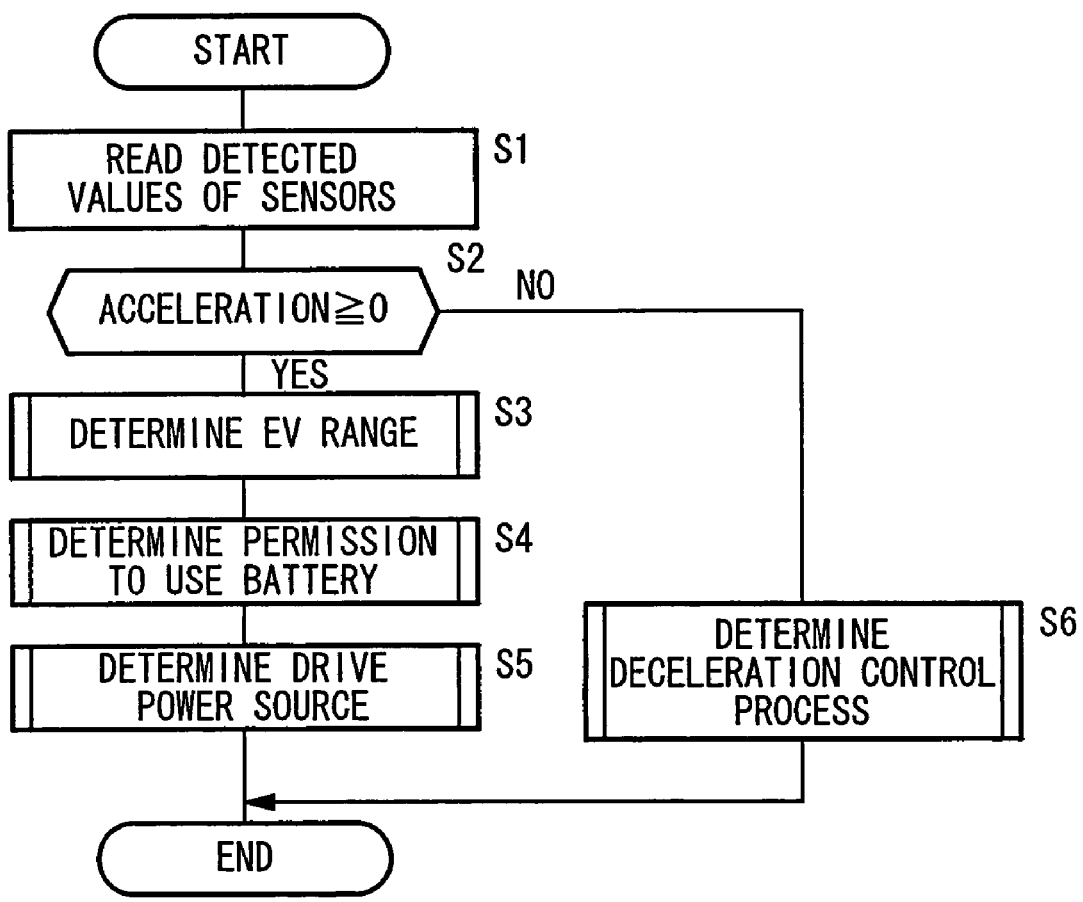

DRIVE CONTROL APPARATUS FOR HYBRID VEHICLE

BACKGROUND OF THE INVENTION

1. Field of the Invention

The present invention relates to a drive control apparatus for a hybrid vehicle whose drive shaft is rotated by an engine and an electric motor, and more particularly to a drive control apparatus for a hybrid vehicle which has two motors for applying drive force (torque) to front and rear wheels of the hybrid vehicle.

2. Description of the Related Art

In recent years, hybrid vehicles having drive wheels rotated by an internal combustion engine and an electric motor have been widely developed. The hybrid vehicle operates in various modes including a so-called EV (Electric Vehicle) mode, in which the engine is disabled and the hybrid vehicle is run only by the motor, for reducing fuel consumption by the engine.

When the hybrid vehicle needs a greater torque, or the electric power remaining in a battery on the hybrid vehicle is low, the engine is started. At this time, the battery is required to supply electric power large enough to start the engine. Therefore, it is necessary to monitor the electric power that remains in the battery, and to control the drive power of the motor, taking into account the electric power that is needed to start the engine.

There has been proposed a system which is a redundant structure having a propulsive motor, and a conventional dedicated starter motor for starting an engine, which works in complement with the propulsive motor (see, for example, Japanese laid-open patent publication No. 10-136508).

When a starter motor starts an engine, the starter motor needs to consume a large amount of electric power, causing a voltage drop across a battery that is connected to the starter motor. Therefore, a system has been proposed to inhibit the starter motor from operating while the hybrid vehicle is running, so that the operation of a controller for controlling the propulsion of the hybrid vehicle will not adversely be affected when the battery voltage drops (see, for example, Japanese patent No. 2,973,797).

On the hybrid vehicle, the motor may be operated in a regenerative mode as an electric generator for charging the battery. When the motor generates electric power in the regenerative mode, it is desirable to distribute as much drive power as possible from the drive wheels to the motor, and any resistance to intake air and exhaust emission of the engine should be small. In order to reduce the resistance to intake air and exhaust emission of the engine, there has been proposed a technique for disabling engine cylinders by inactivating intake and exhaust valves of the engine cylinders (see, for example, Japanese laid-open patent publication No. 2002-201972). According to the proposed technique, a sufficient amount of regenerated electric power can be obtained, an optimum exhaust gas control process is not adversely affected, and fuel consumption is improved.

In the system disclosed in Japanese laid-open patent publication No. 10-136508, the propulsive motor is supplied with electric power from a high-voltage battery, and the starter motor is supplied with electric power from a low-voltage battery. Since the low-voltage battery also supplies electric power to a propulsion controller other than the starter motor, when the engine is started, the voltage across the low-voltage battery drops, possibly affecting the operation of the propulsion controller. Further, with the system disclosed in Japanese patent No. 2,973,797, the engine cannot be started while the hybrid vehicle is running.

If the high-voltage battery is used to start the engine, then the voltage across the low-voltage battery does not drop when the engine is started. In the EV mode, it is necessary to take into account the possibility of starting the engine, and the electric power that can be supplied to the propulsive motor is equal to the difference between the total electric power that can be supplied from the high-voltage battery and the electric power that is required to start the engine. Therefore, a speed range in which the hybrid vehicle can travel in the EV mode, i.e., a rotational speed range of the propulsive motor, is relatively narrow, making it difficult for the hybrid vehicle to give its expected performance sufficiently.

SUMMARY OF THE INVENTION

It is therefore an object of the present invention to provide a drive control apparatus for increasing a range in which a hybrid vehicle is propelled by only a motor with an engine being disabled, for thereby reducing fuel consumption.

Another object of the present invention is to provide a drive control apparatus for increasing a motor propulsion range of a hybrid vehicle to allow the hybrid vehicle to cruise and accelerate in an electric vehicle mode, for thereby reducing fuel consumption.

Still another object of the present invention is to provide a drive control apparatus for smoothly switching between different modes of a hybrid vehicle and preventing an engine rotational speed from varying depending on the load on the hybrid vehicle.

A drive control apparatus for a hybrid vehicle according to the present invention comprises a first motor coupled to a rotational shaft of an engine, a first drive wheel for receiving drive power from the rotational shaft through first clutches, a second motor, a second drive wheel for receiving drive power from the second motor, a first battery for supplying electric power to the first motor and the second motor, and a controller for controlling the first motor, the second motor, the first clutches, and the engine, wherein the controller controls an electric vehicle mode in which the first clutches are disengaged, the supply of fuel to the engine is stopped, and the second motor drives the second drive wheel to propel the hybrid vehicle, and the electric vehicle mode is at least divided into a first propulsion mode and a second propulsion mode, the first propulsion mode is a mode in which the first motor is de-energized, and the second propulsion mode is a mode in which a load imposed on the second motor is greater than in the first propulsion mode, and the first motor is supplied with electric power to rotate the rotational shaft at a predetermined speed.

Since the electric vehicle mode is controlled as the first propulsion mode, in which the first motor is de-energized, and the second propulsion mode, in which the first motor is rotated at a predetermined speed, a range in which the hybrid vehicle is propelled in the electric vehicle mode is increased for reducing fuel consumption.

The controller may switch between the first propulsion mode and the second propulsion mode based on drive power required to propel the hybrid vehicle, a vehicle speed, and a rotational speed and/or a torque of the second motor.

With the above arrangement, as the range in which the hybrid vehicle is propelled in the electric vehicle mode is increased, the hybrid vehicle may be cruised or accelerated in the electric vehicle mode for further reducing fuel consumption.

The controller may switch between the first propulsion mode and the second propulsion mode based on state of charge (SOC) of the first battery.

The controller may switch between the first propulsion mode and the second propulsion mode when the hybrid vehicle is cruising.

When the hybrid vehicle is cruising with little changes in the vehicle speed or the acceleration, the modes can stably be switched, and hence the control system may be simplified.

The controller may switch between the first propulsion mode and the second propulsion mode based on vehicle speeds which allow the hybrid vehicle to achieve a predetermined acceleration with the output of the second motor.

The controller may switch between the first propulsion mode and the second propulsion mode based on a rotational speed of the second motor which allows the hybrid vehicle to achieve a predetermined acceleration with the output of the second motor.

By thus making settings to achieve a predetermined acceleration, it is possible to suppress a speed reduction upon mode switching when the hybrid vehicle is cruised and accelerated, without making the occupants of the hybrid vehicle feel uncomfortable.

The drive control apparatus may further comprise a second clutch disposed between the second motor and the second drive wheel, for being controlled by the controller, wherein the controller switches to an engine propulsion mode in which the first clutches are engaged to transmit drive power of at least one of the engine and the first motor to the first drive wheel, the second clutch being disengaged and the second motor is de-energized in the engine propulsion mode.

Inasmuch as the second clutch is disengaged and the second motor is de-energized in the engine propulsion mode, the second motor does not serves as a load resistance for further reducing fuel consumption.

The controller may equalize the sum of the drive power transmitted to the first drive wheel and the drive power transmitted to the second drive wheel to drive power required to propel the hybrid vehicle, and gradually change each of the drive power transmitted to the first drive wheel and the drive power transmitted to the second drive wheel. With this arrangement, the modes may smoothly be switched.

The drive control apparatus may further comprise a battery usage decision unit for determining whether the first battery is not usable, wherein the controller performs the engine propulsion mode if it is judged by the battery usage decision unit that the first battery is not usable. With this arrangement, the first battery can be protected, and the hybrid vehicle can continuously travel reliably.

When the electric vehicle mode changes to the engine propulsion mode, the controller may equalize the sum of the drive power transmitted to the first drive wheel and the drive power transmitted to the second drive wheel to drive power required to propel the hybrid vehicle, gradually change each of the drive power transmitted to the first drive wheel and the drive power transmitted to the second drive wheel, and engage the first clutches when the output of the engine has reached a predetermined threshold after the engine has started.

The modes can thus smoothly be switched, and the rotation of the engine is prevented from varying depending on the load.

If the controller is supplied with electric power from a second battery whose voltage is lower than the first battery, then the voltage that is supplied to the controller is not affected by operation of the first motor or the second motor.

In the second propulsion mode, at least one cylinder of the engine is disabled to reduce a friction loss, a pumping loss, etc. of the engine.

Rotation of the second motor may be reduced in speed by a gear mechanism and transmitted to the second drive wheel.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 4 is a diagram showing a mode switching map illustrating divisions between a first propulsion mode, a second propulsion mode, and an engine propulsion mode in relation to vehicle speeds and motor torques;

FIG. 6 is a flowchart of a processing sequence of the drive control apparatus;

DESCRIPTION OF THE PREFERRED EMBODIMENTS

A drive control apparatus for a hybrid vehicle according to a preferred embodiment of the present invention will be described below with reference to FIGS. 1 through 17.

Figure 1:
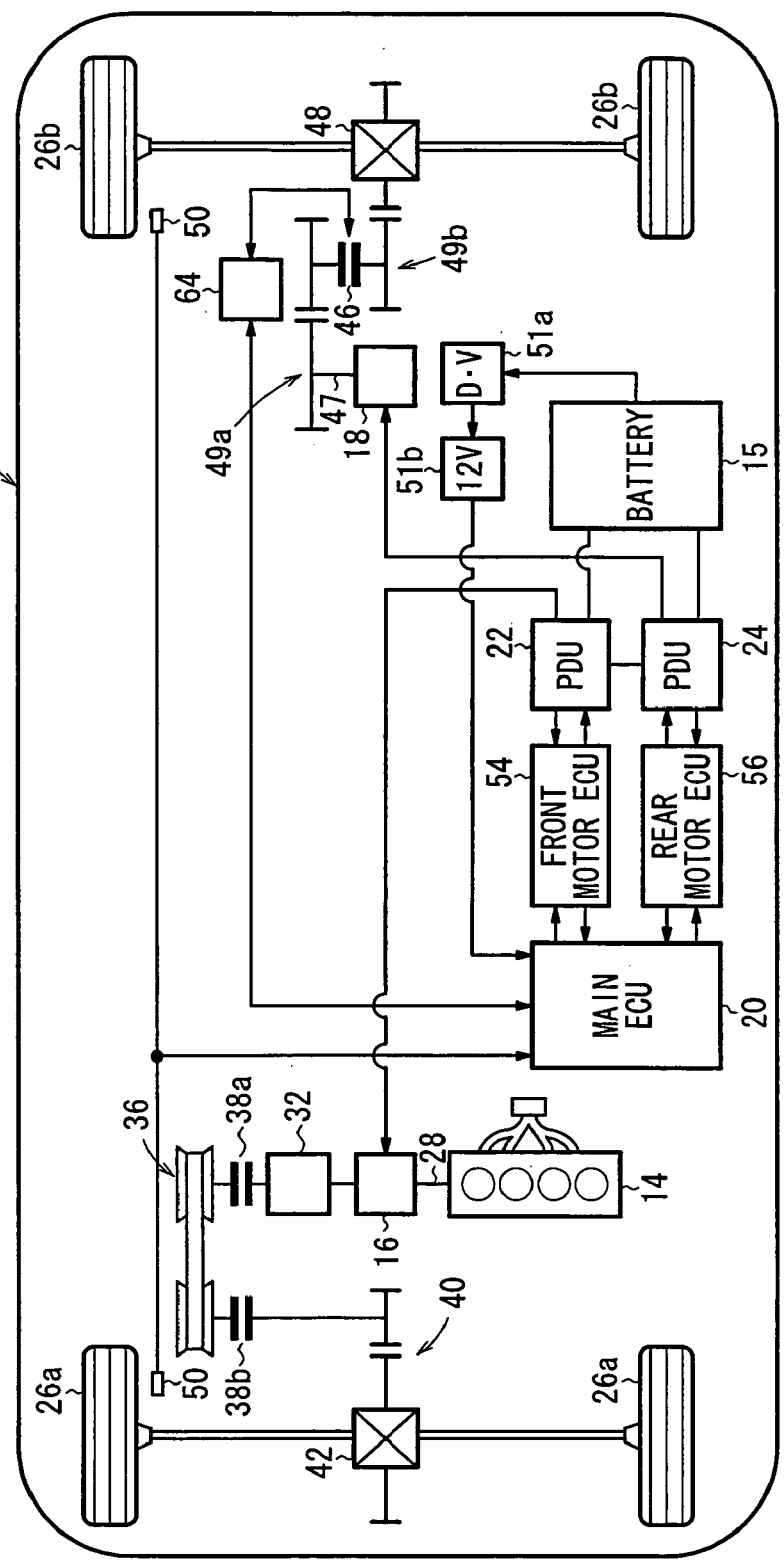
FIG. 1 is a block diagram of a drive system of a hybrid vehicle.

A drive control apparatus 10 (see FIG. 3) according to the embodiment of the present invention is incorporated in a hybrid vehicle 12 (see FIG. 1).

As shown in FIG. 1, the hybrid vehicle 12 is a four-wheel-drive vehicle and includes an internal combustion engine 14, a first motor 16 energized by electric power supplied from a high-voltage (e.g., 144 [V]) battery (first battery) 15, a second motor 18, and a main ECU (Electronic Control Unit) 20 for centralized management and control of the engine 14, the first motor 16, the second motor 18. The first motor 16 may comprise a slim motor that can be connected directly to the crankshaft of the engine 14.

The main ECU 20 comprises a microcomputer (not shown) made up of a RAM (Random Access Memory), a ROM (Read Only Memory), a CPU (Central Processing Unit), an input/output interface, a timer, and other components. The main ECU 20 performs its processing operation according to programs, maps, data, etc. that are stored in the ROM. The main ECU 20 can operate in various different manners by changing programs.

The hybrid vehicle 12 also has first and second PDUs (Power Drive Units) 22, 24 for controlling electric power supplied to the first and second motors 16, 18, respectively, two front wheels 26a that can be driven by the engine 14 and the first motor 16, and two rear wheels 26b that can be driven by the second motor 18. The first PDU 22 and the second PDU 24 have functions to detect the values of currents that are supplied to the first motor 16 and the second motor 18, respectively.

The crankshaft of the engine 14 and the first motor 16 are connected to a common rotational shaft 28, and drive the front wheels 26a through an oil pump 32, a belt-and-pulley mechanism 36, two front clutches (first clutches) 38a, 38b connected respectively to input and output ends of the belt-and-pulley mechanism 36, a gear mechanism 40, and a first differential gear 42. The front clutches 38a, 38b may be replaced with a vehicle starting clutch or a forward/reverse selector clutch.

The oil pump 32 functions as a hydraulic pressure source for hydraulic devices that are employed by the belt-and-pulley mechanism 36.

The second motor 18 drives the rear wheels 26b through a rear clutch (second clutch) 46, a rotational shaft 47, and a second differential gear 48. Gear mechanisms 49a, 49b are connected respectively to input and output ends of the rear clutch 46.

The first motor 16 and the second motor 18 also operate as generators under the control of the first PDU 22 and the second PDU 24. Specifically, the first motor 16 can be rotated by drive power supplied from the engine 14 or the front wheels 26a to generate electric power, which is stored in the battery 15. The second motor 18 can be rotated by drive power supplied from the rear wheels 26b to regenerate electric power, which is also stored in the battery 15.

The front wheels 26a and the rear wheels 26b are provided with respective vehicle speed sensors 50 which are connected to the main ECU 20 for detecting a vehicle speed V of the hybrid vehicle.

The voltage across the battery 15 is dropped by a down-verter (D·V) 51a to a voltage of 12 V that is supplied to charge a low-voltage battery (second battery) 51b. The low-voltage battery 51b supplies electric power to electric devices other than the drive system of the hybrid vehicle, i.e., a controller such as the ECU 20, and other devices such as illuminating units, audio devices.

Figure 2:
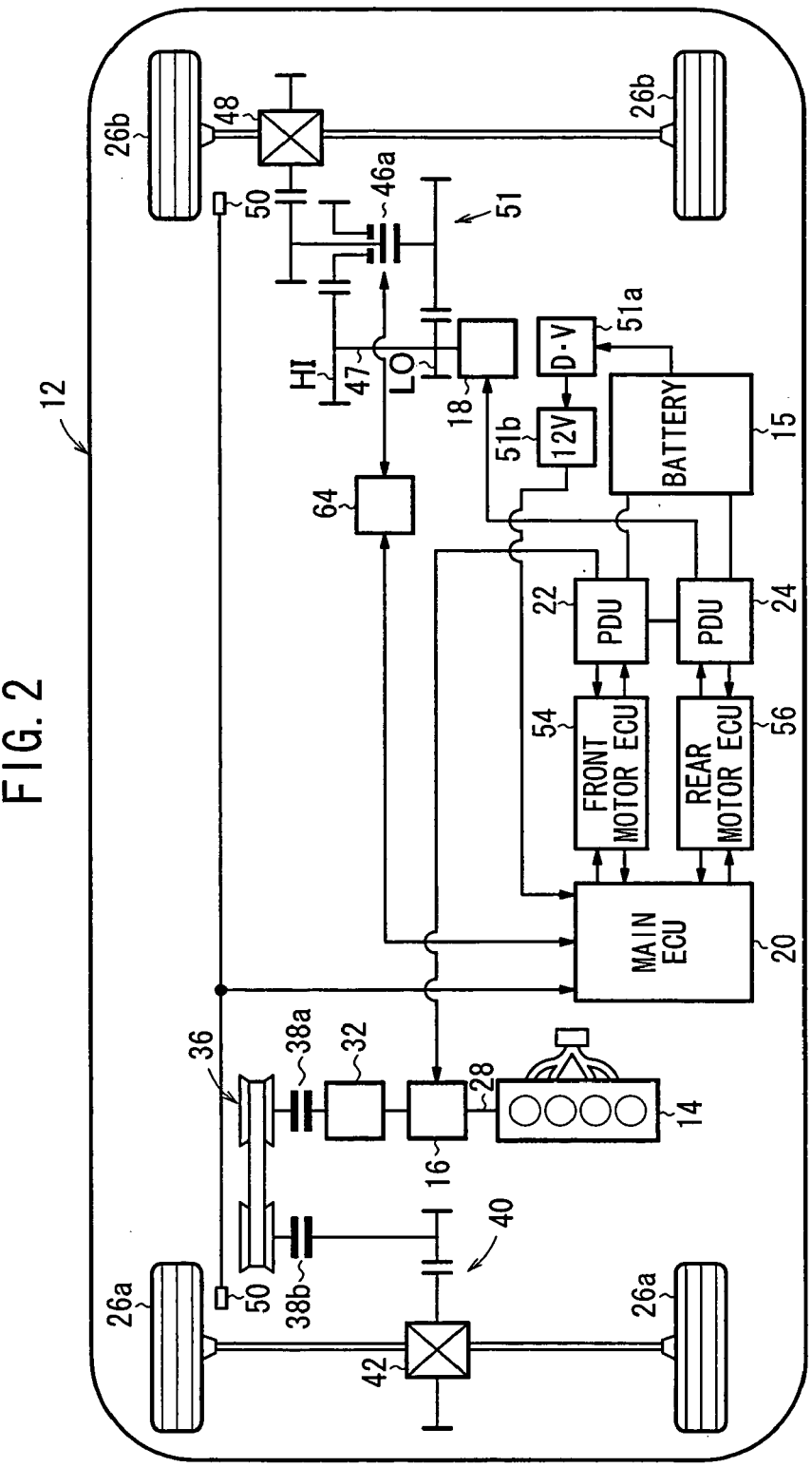
FIG. 2 is a block diagram of a drive system of a hybrid vehicle having a transmission mechanism associated with rear wheels.

As shown in FIG. 2, a two-speed-switching gear mechanism 51 for switching between a high-speed gear HI and a low-speed gear LO, and a rear clutch 46b connected to the high-speed gear HI and the low-speed gear LO may be connected between the second motor 18 and the rear wheels 26b. The rear clutch 46b may be connected and disconnected to the high-speed gear HI and the low-speed gear L depending on the vehicle speed V and the load on the second motor 18. By enabling the rear clutch 46b to connect and disconnect to the high-speed gear HI and the low-speed gear LO, the vehicle speed V of the hybrid vehicle propelled by the second motor 18 and the load on the second motor 18 increases in range, therefore reducing electric power consumption of the battery 15.

Figure 3:
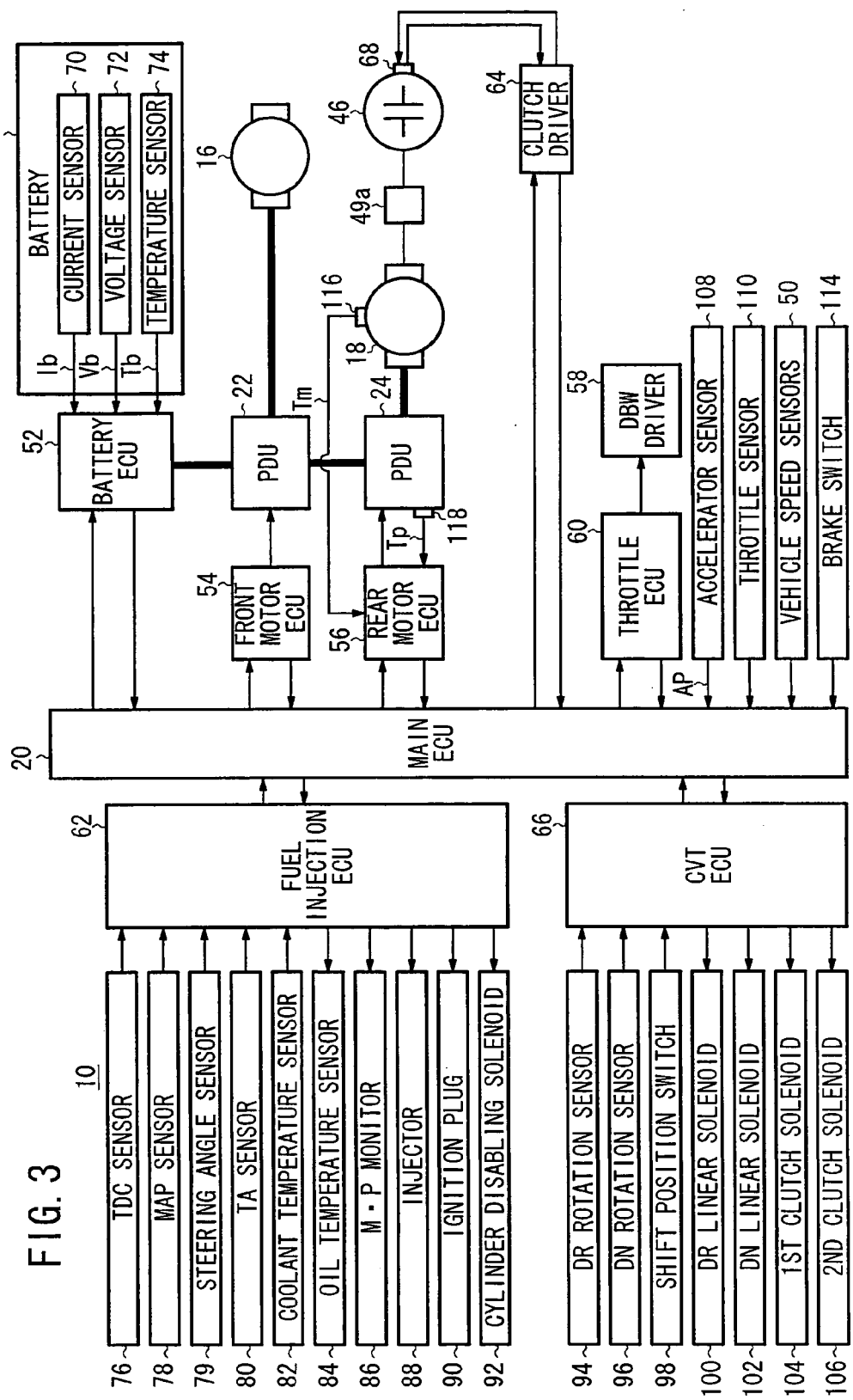
FIG. 3 is a block diagram of a drive control apparatus for the hybrid vehicle according to the present invention.

As shown in FIG. 3, the drive control apparatus 10 includes the main ECU 20, and has a battery ECU 52 for controlling the battery 15, a front motor ECU 54 for controlling the first motor 16 through the first PDU 22, a rear motor ECU 56 for controlling the second motor 18 through the second PDU 24, a throttle ECU 60 for controlling a throttle valve opening of the engine 14 through a DBW driver 58, a fuel injection ECU 62 for controlling an injected amount of fuel, a clutch driver 64 for engaging and disengaging the rear clutch 46, and a continuously variable transmission (CVT) ECU 66 for controlling the belt-and-pulley mechanism 36. A clutch switch 68 for detecting when the rear clutch 46 is engaged and disengaged is mounted on the rear clutch 46, and is connected to the clutch driver 64.

The battery ECU 52 is connected to three sensors associated with the battery 15, i.e., a current sensor 70, a voltage sensor 72, and a temperature sensor 74. The current sensor 70 measures a current Ib that charges and discharges the battery 15. The voltage sensor 72 measures a voltage Vb of the cell chamber of the battery 15. The temperature sensor 74 measures a temperature Tb in, for example, the cell chamber of the battery 15.

The battery ECU 52 calculates state of charge (SOC) of the battery 15 based on an integrated value of the voltage, or charged and discharged energy of the battery 15. The SOC is represented by a numerical value in the range of 0 to 100%. When the SOC is 0%, the battery 15 is in a fully discharged state or an uncharged state. When the SOC is 100%, the battery 15 is in a rated charged state.

To the fuel injection ECU 62, there are connected a TDC (Top Dead Center) sensor 76 for detecting a camshaft rotational angle, a MAP sensor 78 for detecting an intake air pressure, a steering angle sensor 79 for detecting a steering angle of the crankshaft of the engine 14, a TA (Temperature of Air) sensor 80 for detecting an intake air temperature, a coolant temperature sensor 82 for detecting an engine coolant temperature, an oil temperature sensor 84 for detecting an engine oil temperature, and an M·P (Master Power) monitor 86 for detecting a brake master power negative pressure. To the fuel injection ECU 62, there are also connected an injector 88 serving as a fuel injection actuator for each of the cylinders of the engine 14, an ignition plug 90 serving as a fuel ignition actuator for each of the cylinders of the engine 14, and a cylinder disabling solenoid 92 for selectively disabling the cylinders of the engine 14.

To the continuously variable transmission ECU 66, there are connected a DR rotation sensor 94 for detecting a drive pulley rotational speed of the belt-and-pulley mechanism 36, a DN rotation sensor 96 for detecting a driven pulley rotational speed of the belt-and-pulley mechanism 36, and a shift position switch 98 for detecting a shift lever position. To the continuously variable transmission ECU 66, there are also connected a DR linear solenoid 100 for positioning a drive pulley of the belt-and-pulley mechanism 36, a DN linear solenoid 102 for positioning a driven pulley of the belt-and-pulley mechanism 36, and a first front clutch solenoid 104 and a second front clutch solenoid 106 for engaging and disengaging the two front clutches 38a, 38b, respectively.

To the main ECU 20, there are connected an accelerator sensor 108 for detecting the displacement AP of the accelerator pedal of the hybrid vehicle 12, a throttle sensor 110 for detecting a throttle valve opening, the vehicle speed sensors 50, and a brake switch 114 for detecting when the brake system of the hybrid vehicle 12 is turned on and off.

The second motor 18 is provided with a motor temperature sensor 116 for detecting the temperature Tm thereof. The second PDU 24 is provided with a PDU temperature sensor 118 for detecting the temperature Tp thereof. The motor temperature sensor 116 and the PDU temperature sensor 118 are connected to the rear motor ECU 56.

The motor temperature sensor 116, the PDU temperature sensor 118, and the temperature sensor 74 may be located in thermally weakest regions or positions where the temperatures of thermally weakest regions can be estimated. For example, the motor temperature sensor 116 may detect the temperature of windings of the second motor 18, and the PDU temperature sensor 118 may comprise an on-chip sensor of a semiconductor device. Temperature data produced as detected results from the motor temperature sensor 116 and the PDU temperature sensor 118 are also supplied to the main ECU 20.

The main ECU 20 switches between two modes, i.e., an EV mode and an engine propulsion mode, and controls the engine 14, the first motor 16, the second motor 18, the front clutches 38a, 38b, and the rear clutch 46 according to one of the selected modes.

In the EV mode, the main ECU 20 disengages the front clutches 38a, 38b and engages the rear clutch 46, propelling the hybrid vehicle with only the drive power produced by the second motor 18. At the same time, the main ECU 20 cuts off the supply of fuel to disable the engine 14.

In the engine propulsion mode, the main ECU 20 supplies fuel to the engine 14 and engages the clutches 38a, 38b apply drive power from the engine 14, thus propelling the hybrid vehicle.

The EV mode is divided into a first propulsion mode and a second propulsion mode. The first propulsion mode is a mode for stopping the supply of electric power to the first motor 16. The second propulsion mode is a mode for supplying electric power to the first motor 16 to rotate the rotational shaft 28 at a predetermined speed, and disabling at least one of the cylinders of the engine 14. In the second propulsion mode, the rotational shaft 28 is placed under no load, and rotates idly. The main ECU 20 switches between the first propulsion mode and the second propulsion mode based on a mode switching map 120 shown in FIG. 4. By disabling a cylinder, for example, at least one of the intake and exhaust valves of the cylinder is kept closed, thus reducing a friction loss and a pumping loss of the engine 14.

The mode switching map 120 has a first threshold M1, a second threshold M2, and a resistance curve based on the vehicle speed V and the torque of the second motor 18. The first threshold Ml and the second threshold M2 are established such that the torque of the second motor 18 is substantially inversely proportional to the vehicle speed V. The first threshold M1 is smaller than the second threshold M2. The resistance curve L represents a running resistance corresponding to the vehicle speed V at the time the hybrid vehicle 12 runs on a road with 0% gradient, and gradually rises in line with the vehicle speed V.

The first propulsion mode is represented by a cross-hatched area 122 above the resistance curve L and below the first threshold M1. The second propulsion mode is represented by a hatched area 124 above the resistance curve L and the first threshold M1, and below the second threshold M2. The engine propulsion mode is performed in an area 126 above the second threshold M2.

In the engine propulsion mode, basically, the engine 14 is operated. However, depending on the situation in which the hybrid vehicle 12 travels, at least one of the engine 14 and the first motor 16 may drive the front wheels 16a.

A process of establishing the first threshold M1 and the second threshold M2 will be described below with reference to FIGS. 5A and 5B.

Figure 5B:
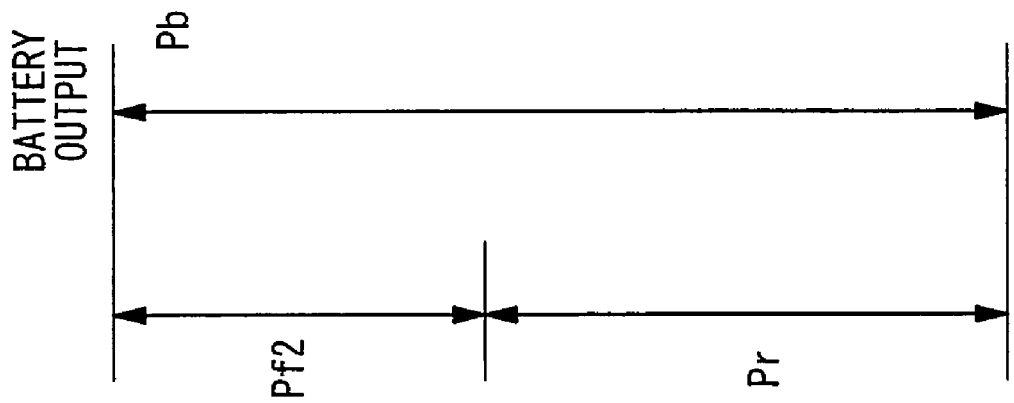
FIG. 5B is a diagram showing electric power supplied to the second motor in the first propulsion mode.
Figure 5A:
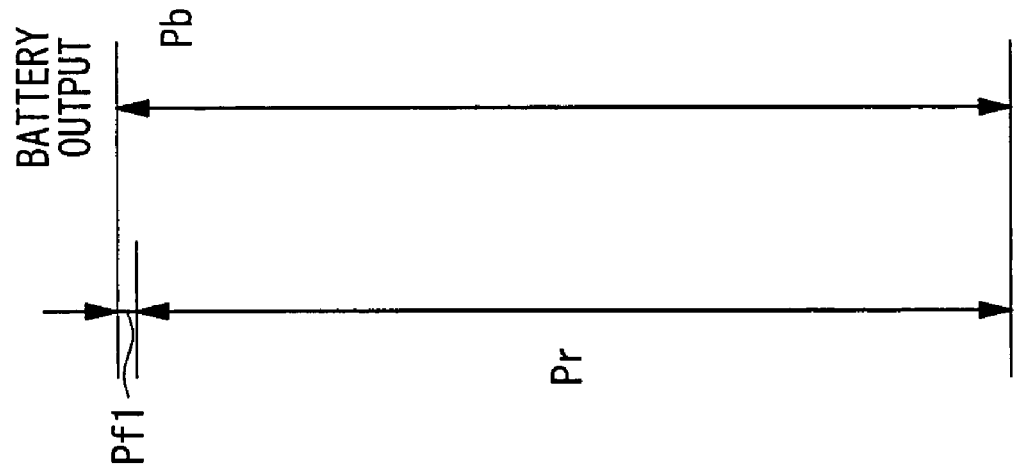
FIG. 5A is a diagram showing electric power supplied to a second motor in the second propulsion mode.

As shown in FIG. 5A, if the electric power that the battery 15 can supply is represented by Pb and the electric power with which the first motor 16 rotates the rotational shaft 28 idly is represented by Pf1, then the electric power Pr that can be supplied to the second motor 18 is expressed by Pr=Pb−Pf1. Values of the torque [N·m], i.e., the second threshold M2, at values of the vehicle speed V are determined based on the electric power Pr. In the EV mode, since the front clutches 38a, 38b are disengaged, the electric power Pf1 is of a very small value, just large enough to rotate the rotational shaft 28 and the crankshaft of the engine 14. By disabling cylinders of the engine 14, the pumping loss and the friction loss of the engine 14 can be reduced. By rotating the rotational shaft 28 with the first motor 16, the energy required to accelerate the hybrid vehicle 12 can be reduced. Accordingly, the electric power Pf1 can be made smaller. Therefore, much of the electric power Pb supplied from the battery 15 can be used as the electric power Pr for the second motor 18.

As shown in FIG. 5B, if the electric power that is required instantaneously to start the engine 14 is represented by Pf2, then the electric power Pr that can be supplied to the second motor 18 is expressed by Pr=Pb−Pf2. Values of the torque [N·m], i.e., the first threshold M1, at values of the vehicle speed V are determined based on the electric power Pr. When the engine 14 is started, an instantaneously large current flows because a large output which is greater than an intake and exhaust resistance is needed. Therefore, the electric power Pf2 is greater than the electric power Pf1, thus limiting the electric power Pr that is supplied to the second motor 18. Consequently, the values of the first threshold M1 are set so as to be smaller than the values of the second threshold M2 (see FIG. 4).

As the battery 15 is progressively discharged, the electric power Pb that the battery 15 can supply is lowered. When the SOC of the battery 15 is small, the values of both the first threshold M1 and the second threshold M2 are lowered. Specifically, the mode switching map 120 (see FIG. 4) uses three parameters, i.e., the vehicle speed V, the torque of the second motor 18, and the SOC.

Operation of the drive control apparatus 10 thus constructed will be described below.

First, a processing sequence that is executed by the main ECU 20 based on a program stored in the ROM will be described below with reference to FIGS. 6 through 17. The program is stored in the ROM, and is repeatedly executed in a predetermined minimal period of time by the CPU.

As shown in FIG. 6, the main ECU 20 reads detected values of the various sensors that are connected to the main ECU 20 in step S1. Specifically, the main ECU 20 reads, for example, detected values of the vehicle speed V, the SOC, the temperature Tm of the second motor 18, the temperature Tp of the second PDU 24, the temperature Tb of the battery 15 and supply current of the battery 15.

In step S2, the main ECU 20 determines an acceleration α by differentiating the vehicle speed V detected by the vehicle speed sensor 50. If the acceleration α is a positive value, then control goes to step S3. If the acceleration α is a negative value, then control goes to step S6.

In step S3, the main ECU 20 performs a process for determining an EV range. In step S4 (battery usage decision unit), the main ECU 20 performs a process for judging a permission to use the battery 15. In step S5, the main ECU 20 performs a process for determining a drive power source.

In step S6, the main ECU 20 performs a process for determining a deceleration control process. After step S5 or S6, the processing sequence shown in FIG. 6 is put to an end.

The processes in steps S3, S4, and S5 will be described in detail below. The process for determining a deceleration control process in step S6 will not be described in detail below.

Figure 7:
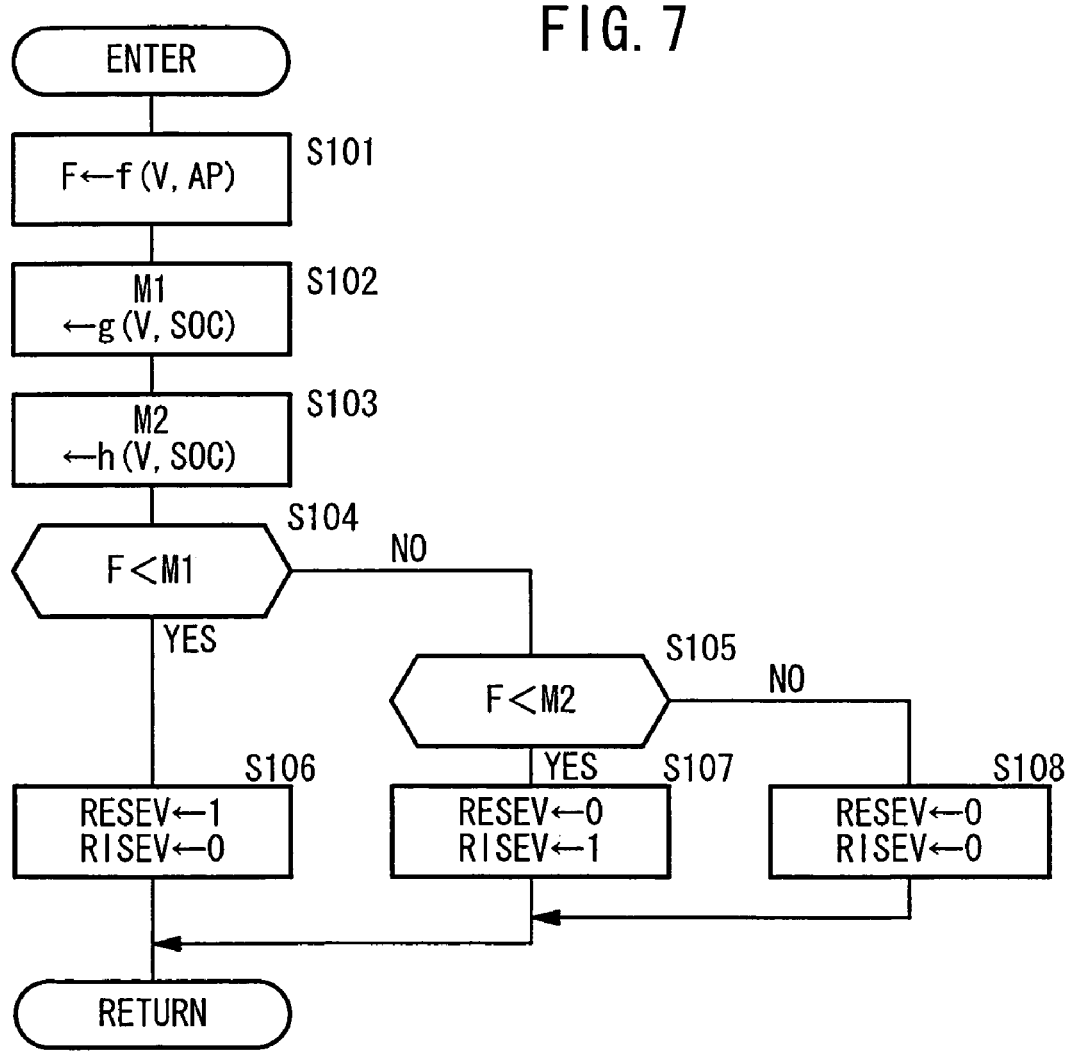
FIG. 7 is a flowchart of a processing sequence for determining an EV range.
Figure 8:
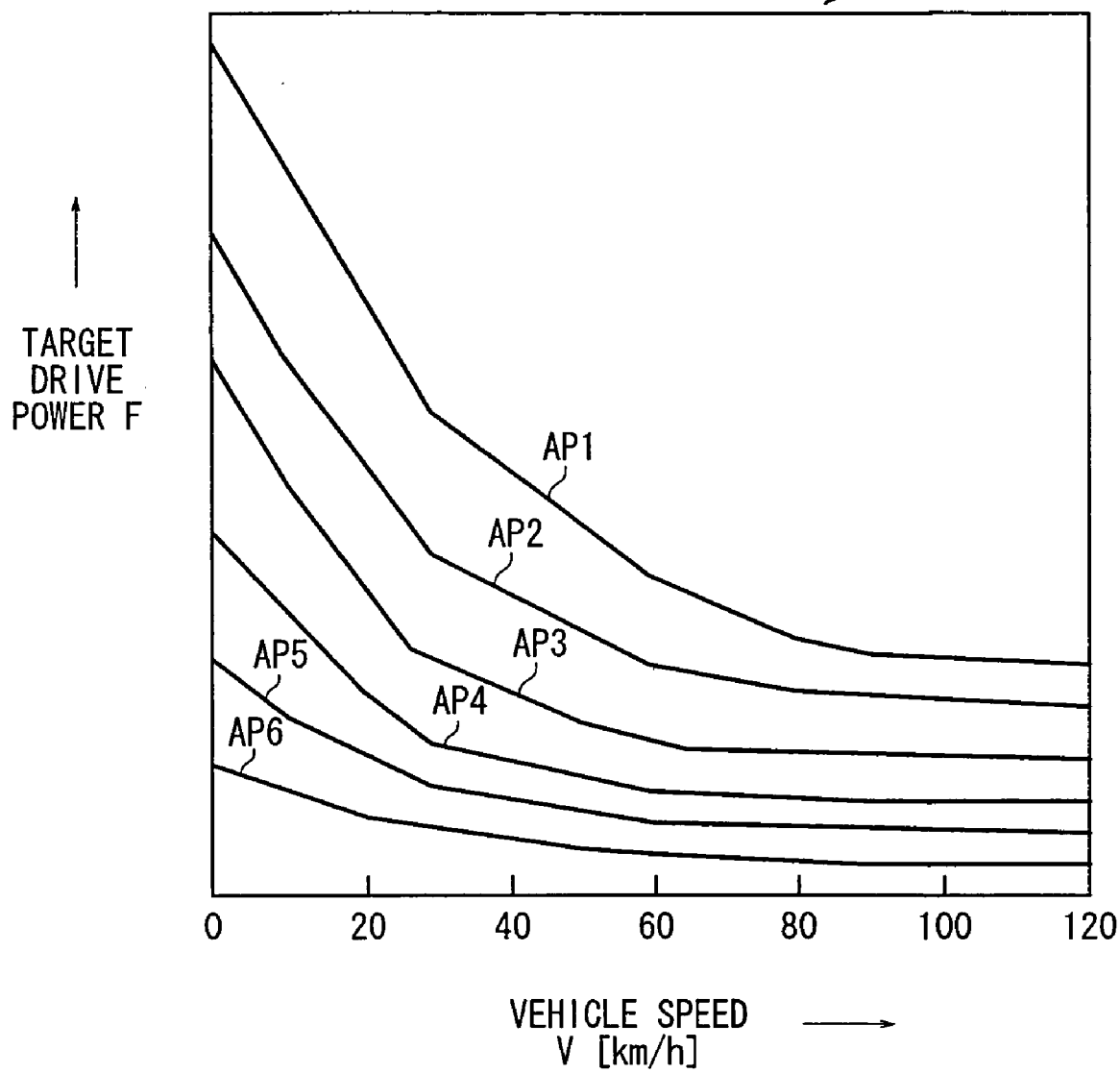
FIG. 8 is a diagram showing a target drive power map for determining a target drive power.

First, the process for determining an EV range, i.e., details of the processing sequence in step S3, will be described below with reference to FIG. 7.

In step S101, the main ECU 20 determines a target drive power F based on the vehicle speed V and the accelerator pedal displacement AP (see FIG. 3). The target drive power F is calculated as F←f (V, AP) by a predetermined function f having the vehicle speed V and the accelerator pedal displacement AP as parameters, or is determined based on a target drive power map 128 shown in FIG. 8. The target drive power map 128 has six recorded levels AP1 through AP6 of the accelerator pedal displacement AP depending on the vehicle speed V. If the target drive power F is determined based on the target drive power map 128, then it is calculated by an interpolation from the actual value of the accelerator pedal displacement AP based on the recorded levels.

In step S102, the main ECU 20 determines a first threshold M1 based on the vehicle speed V and the SOC. The first threshold M1 is retrieved from the mode switching map 120 shown in FIG. 4 or is calculated as M1←g (V, SOC) by a predetermined function g which returns the same value as the mode switching map 120.

In step S103, the main ECU 20 determines a second threshold M2 based on the vehicle speed V and the SOC. The second threshold M2 is retrieved from the mode switching map 120 or is calculated as M2←h (V, SOC) by a predetermined function h which returns the same value as the mode switching map 120.

In step S104, the main ECU 20 compares the target drive power F with the first threshold M1. If the target drive power F is smaller than the first threshold M1, then control goes to step S106. If the target drive power F is equal to or greater than the first threshold M1, then control goes to step S105.

In step S105, the main ECU 20 compares the target drive power F with the second threshold M2. If the target drive power F is smaller than the second threshold M2, then control goes to step S107. If the target drive power F is equal to or greater than the second threshold M2, then control goes to step S108.

In step S106, i.e., if the target drive power F is smaller than the first threshold M1, the main ECU 20 sets a flag RESEV to "1", indicating that the first motor 16 is to be de-energized, and sets a flag RISEV to "0", indicating that the first motor 16 is to rotate idly and cylinders of the engine 14 are to be disabled.

In step S107, i.e., if the target drive power F is between the first threshold M1 and the second threshold M2, the ECU 20 sets the flag RESEV to "0" and sets the flag RISEV to "1".

In step S108, i.e., if the target drive power F is equal to or greater than the second threshold M2, the ECU 20 sets the flag RESEV to "0" and sets the flag RISEV to "0".

Figure 9:
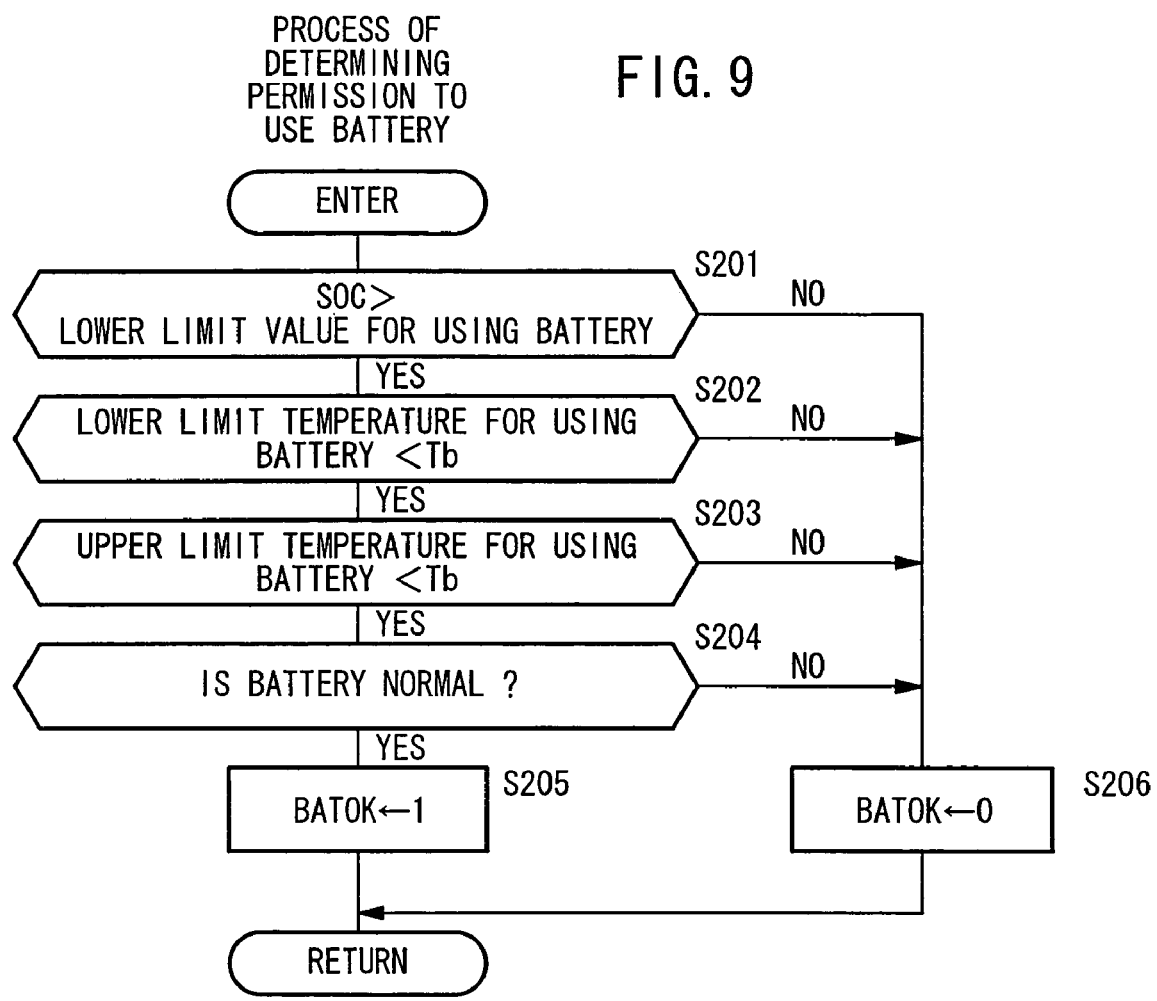
FIG. 9 is a flowchart of a processing sequence for judging permission to use a battery.

The process for judging a permission to use the battery 15, i.e., details of the processing sequence in step S4 (see FIG. 6), will be described below with reference to FIG. 9.

In step S201, the main ECU 20 compares the SOC with a lower limit value for using the battery 15. If the SOC is greater than the lower limit value, then control goes to step S202. If the SOC is smaller than the lower limit value, then control goes to step S206.

In step S202, the main ECU 20 compares the temperature Tb (see FIG. 3) of the battery 15 with a lower limit temperature for using the battery 15. If the temperature Tb is greater than the lower limit temperature, then control goes to step S203. If the temperature Tb is smaller than the lower limit temperature, then control goes to step S206.

In step S203, the main ECU 20 compares the temperature Tb of the battery 15 with an upper limit temperature for using the battery 15. If the temperature Tb is smaller than the upper limit temperature, then control goes to step S204. If the temperature Tb is greater than the upper limit temperature, then control goes to step S206.

In step S204, the main ECU 20 determines whether the battery 15 is working normally or not. Specifically, the battery ECU 52 directly determines whether the battery 15 is working normally or not, and supplies a flag indicative of the determined result to the main ECU 20, which then confirms whether the battery 15 is working normally or not based on the supplied flag. If the battery 15 is working normally, then control goes to step S205. If the battery 15 is not working normally, then control goes to step S206. The battery ECU 52 may determine whether the battery 15 is working normally or not by detecting the voltage across the battery 15 and comparing the detected voltage with a predetermined value. If the battery 15 comprises a plurality of interconnected cells, then the battery ECU 52 may determine whether the battery 15 is working normally or not based on a voltage difference or a temperature difference between the cells.

In step S205, the main ECU 20 sets a flag BATOK to "1", indicating that the battery 15 can be used. In step S206, the main ECU 20 sets the flag BATOK to "0", indicating that the battery 15 cannot be used.

Figure 10:
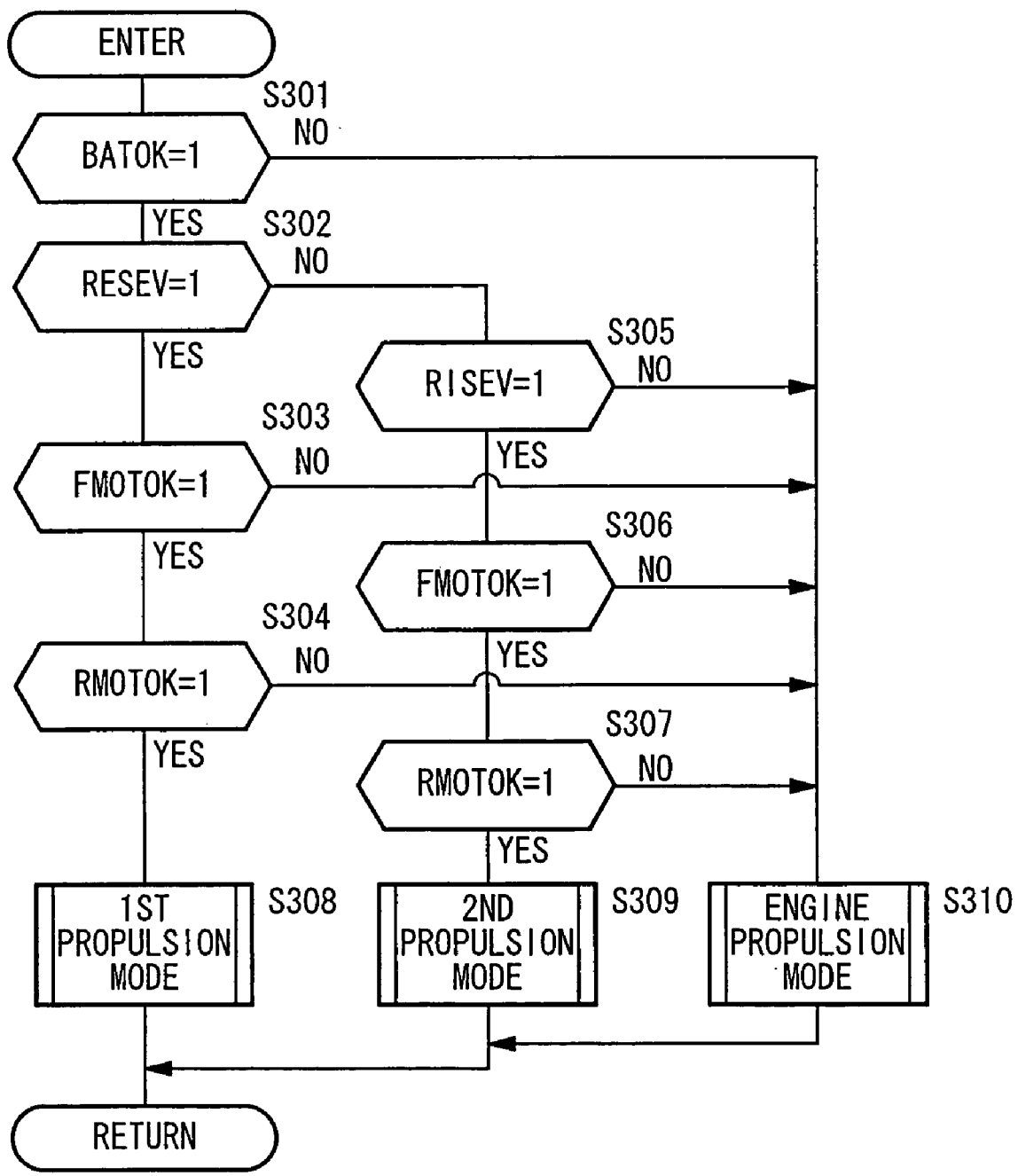
FIG. 10 is a flowchart of a processing sequence for determining a drive power source.

The process for determining a drive power source, i.e., details of the processing sequence in step S5 (see FIG. 6), will be described below with reference to FIG. 10.

In step S301, the main ECU 20 confirms the value of the flag BATOK. If the value of the flag BATOK is "1", then control goes to step S302. If the value of the flag BATOK is "0", then control goes to step S310.

In step S302, the main ECU 20 confirms the value of the flag RESEV. If the value of the flag RESEV is "1", then control goes to step S303. If the value of the flag RESEV is "0", then control goes to step S305.

In step S303, the main ECU 20 confirms the value of a flag FMOTOK indicative of whether the first motor 16 is working normally or not. If the value of the flag FMOTOK is "1", indicating that the first motor 16 is working normally, then control goes to step S304. If the value of the flag FMOTOK is "0", indicating that the first motor 16 is not working normally, then control goes to step S310. The flag FMOTOK is set by the front motor ECU 54 and supplied to the main ECU 20.

In step S304, the main ECU 20 confirms the value of a flag RMOTOK indicative of whether the second motor 18 is working normally or not. If the value of the flag RMOTOK is "1", indicating that the second motor 18 is working normally, then control goes to step S308. If the value of the flag RMOTOK is "0", indicating that the second motor 18 is not working normally, then control goes to step S310. The flag RMOTOK is set by the rear motor ECU 56 and supplied to the main ECU 20. The second motor 18 may not be working normally because of, for example, a wire disconnection, a short circuit, or an overcurrent.

In step S305, the main ECU 20 confirms the value of the flag RISEV. If the value of the flag RISEV is "1", then control goes to step S306. If the value of the flag RISEV is "0", then control goes to step S310.

In step S306, the main ECU 20 confirms the value of the flag FMOTOK. If the value of the flag FMOTOK is "1", then control goes to step S307. If the value of the flag FMOTOK is "0", then control goes to step S310.

In step S307, the main ECU 20 confirms the value of the flag RMOTOK. If the value of the flag RMOTOK is "1", then control goes to step S309. If the value of the flag RMOTOK is "0", then control goes to step S310.

In step S308, the main ECU 20 sets up for the first propulsion mode. In step S309, the main ECU 20 sets up for the second propulsion mode. In step S310, the main ECU 20 sets up for the engine propulsion mode.

The first propulsion mode, i.e., the EV mode with the engine 14 disabled, or the processing sequence corresponding to the step S308 (see FIG. 10), will be described below with reference to FIG. 11.

In step S401, the main ECU 20 confirms a flag ENGSTPEV indicative of the first propulsion mode. The flag ENGSTPEV has an initial value of "0".

If the value of the flag ENGSTPEV is "1", i.e., a mode change to the first propulsion mode has been completed, then control goes to step S402. If the value of the flag ENGSTPEV is "0", i.e., if the hybrid vehicle 12 is in an initial state or in the middle of changing from a previous mode to the first propulsion mode, then control goes to step S403.

In step S402, the main ECU 20 sets the target drive power F for the output of the second motor 18.

In step S403, the main ECU 20 confirms a flag IDSTPEV indicative of the second propulsion mode. If the value of the flag IDSTPEV is "1", i.e., if a previous mode is the second propulsion mode, then control goes to step S404. If the value of the flag IDSTPEV is "0", i.e., if the values of both the flags IDSTPEV, ENGSTPEV are "0" and a previous mode is the engine propulsion mode, then control goes to step S406.

In step S404, the main ECU 20 instructs the front motor ECU 54 to produce the output "0" from the first motor 16.

In step S405, the main ECU 20 sets the flag ENGSTPEV to "1" and sets the flag IDSTPEV to "0". The main ECU 20 also sets a flag ENGDRV indicative of the engine propulsion mode to "0". The mode shift to the first propulsion mode is finished by the processing in step S405.

In step S406, the main ECU 20 performs a control process for reducing the output of the engine 14. The output of the engine 14 is set as an output value produced by, for example, subtracting a predetermined infinitesimal value from a previous output value.

In step S407, the main ECU 20 calculates an output of the second motor 18 and supplies the calculated output to the rear motor ECU 56. The output of the second motor 18 is set as a value produced by subtracting the output value of the engine 14 from the target drive power F.

In step S408, the main ECU 20 confirms the output value of the engine 14. If the output value of the engine 14 is substantially "0", then control goes to step S409. Otherwise, control goes to step S410.

In step S409, the main ECU 20 disengages the front clutches 38a, 38b. Thereafter, control goes to step S405.

In step S410, the main ECU 20 sets the flags ENGSTPEV, IDSTPEV, and ENGDRV to "0". The mode change to the first propulsion mode is continued by the processing in step S410.

Figure 11:
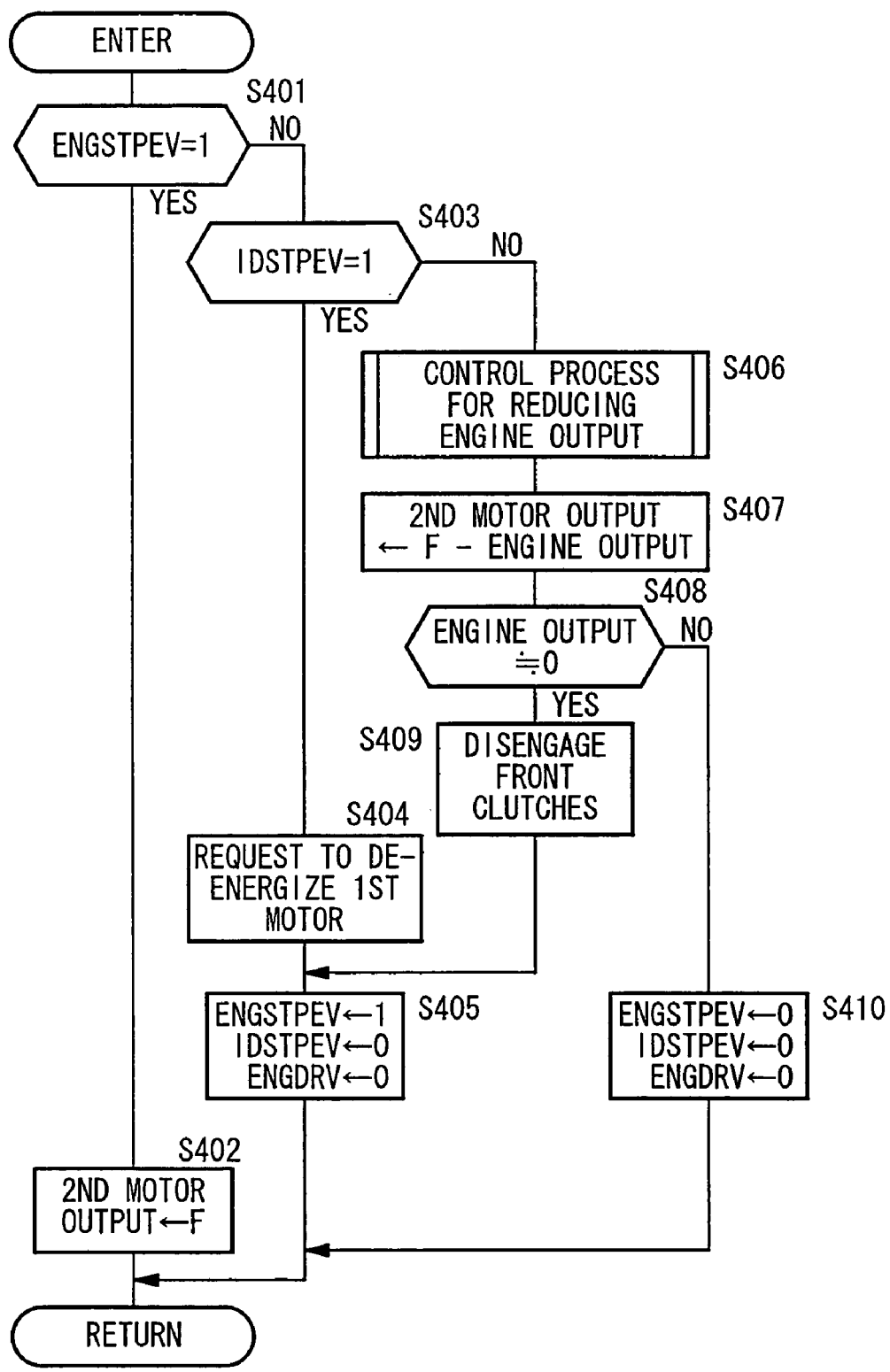
FIG. 11 is a flowchart of a processing sequence of the first propulsion mode.
Figure 12:
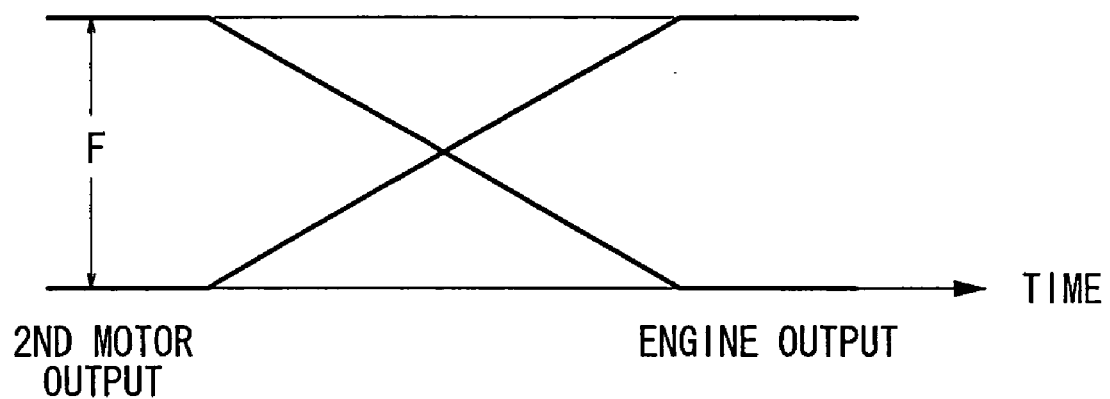
FIG. 12 is a timing chart showing how the output of an engine and the output of the second motor change when the engine propulsion mode changes to an EV mode.

After the processing in step S402, step S405, and step S410, the present cycle of the processing sequence shown in FIG. 11 is put to an end.

In the processing from step S406 to step S408, the mode from the engine propulsion mode to the first propulsion mode can be changed while the output of the engine 14 is gradually reduced from the target drive power F to substantially zero. At this time, since the output of the second motor 18 is gradually increased to make up for a reduction in the output of the engine 14 for equalizing the sum of the output of the engine 14 and the output of the second motor 18 to the target drive power F, the mode from the engine propulsion mode to the first propulsion mode can smoothly be changed without making the occupants of the hybrid vehicle 12 uncomfortable.

Alternatively, in step S408, a timer may be used so that the mode change from the engine propulsion mode to the first propulsion mode is compulsorily completed after a predetermined time of the timer lapses.

The second propulsion mode, i.e., the EV mode with at least one engine cylinder disabled, or the processing sequence corresponding to the step S309 (see FIG. 10), will be described below with reference to FIG. 13.

In step S501, the main ECU 20 confirms the flag IDSTPEV indicative of the second propulsion mode. The flag IDSTPEV has an initial value of "0".

If the value of the flag IDSTPEV is "1", i.e., a mode change to the second propulsion mode has been completed, then control goes to step S502. If the value of the flag IDSTPEV is "0", i.e., if the hybrid vehicle 12 is in an initial state or in the middle of changing from a previous mode to the second propulsion mode, then control goes to step S503.

In step S502, the main ECU 20 sets the target drive power F for the output of the second motor 18.

In step S503, the main ECU 20 confirms the flag ENGSTPEV indicative of the first propulsion mode. If the value of the flag ENGSTPEV is "1", i.e., if a previous mode is the first propulsion mode, then control goes to step S504. If the value of the flag ENGSTPEV is "0", i.e., if a previous mode is the engine propulsion mode, then control goes to step S506.

In step S504, the main ECU 20 instructs the front motor ECU 54 to idly rotate the first motor 16.

In step S505, the main ECU 20 sets the flag IDSTPEV to "1" and sets the flags ENGSTPEV, ENGDRV to "0". The mode shift to the second propulsion mode is finished by the processing in step S505.

The processing in steps S506 through S509 is the same as the processing in steps S406 through S409. That is, the output of the engine 14 is gradually reduced to substantially zero and the output of the second motor 18 is gradually increased in steps S506 through S509.

In step S510, the main ECU 20 sets the flags ENGSTPEV, IDSTPEV, and ENGDRV to "0". The mode change to the second propulsion mode is continued by the processing in step S510.

Figure 13:
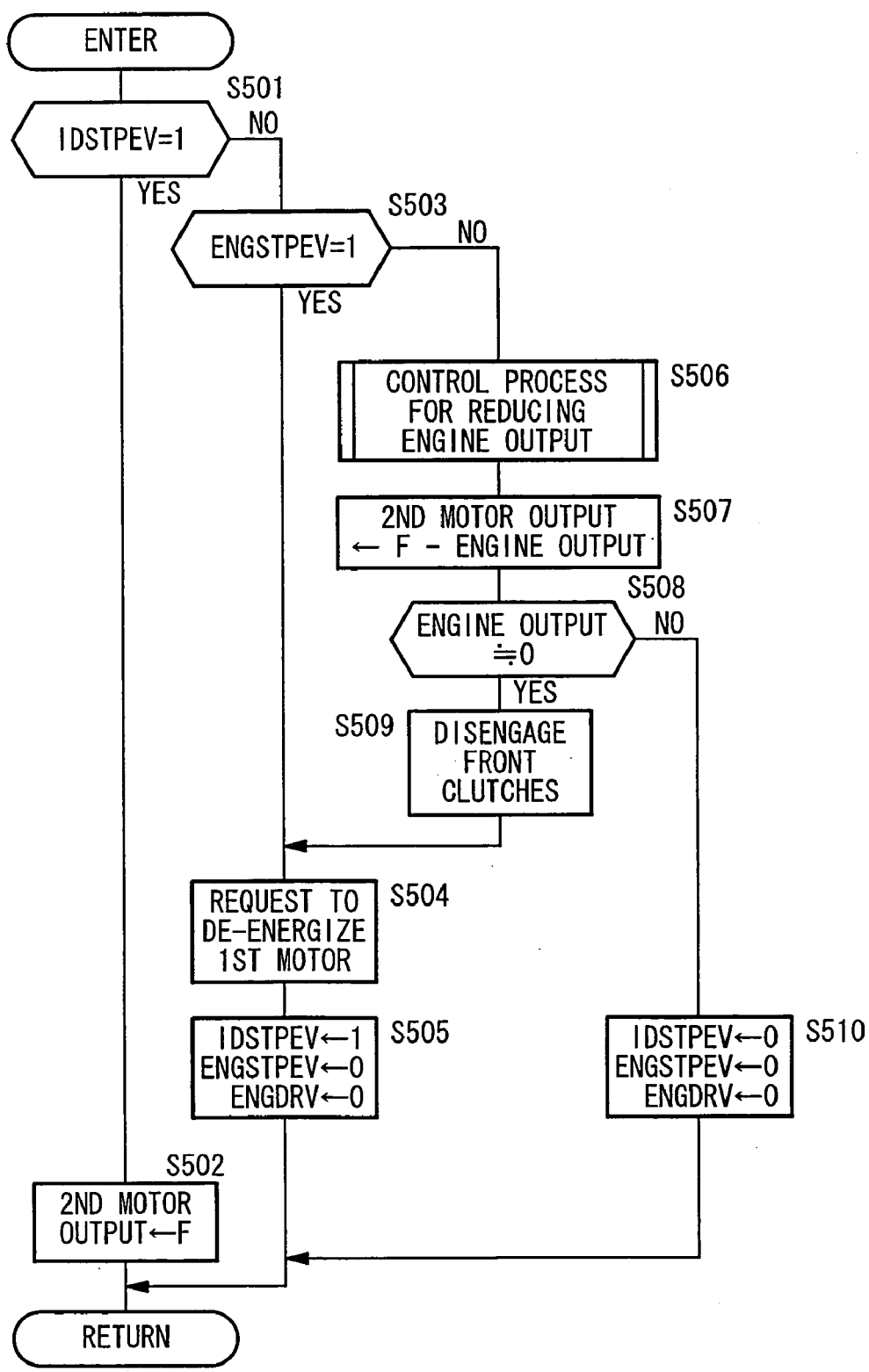
FIG. 13 is a flowchart of a processing sequence of the second propulsion mode.

After the processing in step S502, step S505, and step S510, the present cycle of the processing sequence shown in FIG. 13 is put to an end.

The engine propulsion mode, i.e., the processing sequence corresponding to the step S310 (see FIG. 10), will be described below with reference to FIG. 14.

In step S601, the main ECU 20 confirms the flag ENGDRV indicative of the engine propulsion mode. The flag ENGDRV has an initial value of "0".

If the value of the flag ENGDRV is "1", i.e., a mode change to the engine propulsion mode has been completed, then control goes to step S602. If the value of the flag ENGSTPEV is "0", i.e., if the hybrid vehicle 12 is in an initial state or in the middle of changing from a previous mode to the engine propulsion mode, then control goes to step S603.

In step S602, i.e., if a mode change to the engine propulsion mode has been completed, the main ECU 20 sets the flag ENGDRV to "1" and sets the flags IDSTPEV, ENGSTPEV to "0".

In step S603, the main ECU 20 confirms the flag ENGSTPEV indicative of the first propulsion mode. If the value of the flag ENGSTPEV is "1", i.e., if the previous mode is the first propulsion mode, then control goes to step S604. If the value of the flag ENGSTPEV is "0", i.e., if the previous mode is the engine propulsion mode, then control goes to step S605.

In step S604, the main ECU 20 controls the front motor ECU 54 to energize the first motor 16 to rotate the crankshaft of the engine 14, and controls the fuel injection ECU 62 to inject fuel and ignite the fuel with the ignition plugs 90, thus starting the engine 14. The processing in step S604 is performed when the first propulsion mode changes directly to the engine propulsion mode bypassing the second propulsion mode, which occurs when the hybrid vehicle 12 is quickly accelerated. In this case, the first motor 16 needs a relatively large amount of electric power Pf2 (see FIG. 5B) because the first motor 16 operates as a starter of the engine 14 and undergoes a large load including a resistance to intake air and exhaust emission. Since the first threshold M1 indicative of the first propulsion mode is established relative to the electric power Pf2, the engine 14 can reliably be started within the performance of the battery 15.

Furthermore, since the previous mode is the first propulsion mode, the front clutch 38a is disengaged, and the engine 14 can easily be started as it is under no load.

In step S605, the main ECU 20 controls the fuel injection ECU 62 to inject fuel and ignite the fuel with the ignition plugs 90, thus starting the engine 14. At this time, since the engine 14 has already been rotating at an idling speed due to the process of the second propulsion mode, there is almost no increase in the current supplied to the first motor 16.

After steps S604, S605, the main ECU 20 confirms a startup of the engine 14 in step S606. If the engine 14 has not been started, then the main ECU 20 waits until the engine 14 has been started.

In step S607, the main ECU 20 controls the first front clutch solenoid 104 to engage the front clutch 38a on the input end of the belt-and-pulley mechanism 36. Therefore a small mechanical load is put on the engine 14 from the belt-and-pulley mechanism 36.

In step S608, the main ECU 20 performs a control process for increasing the output of the engine 14. The output of the engine 14 is set as an output value produced by adding a predetermined infinitesimal value to a previous output value.

In step S609, the main ECU 20 compares the output of the engine 14 at the time with a threshold T1 that serves as a reference for engaging the front clutch 38b. If the output of the engine 14 is smaller than the threshold T1, then the present cycle of the processing sequence shown in FIG. 14 is put to an end. If the output of the engine 14 is equal to or greater than the threshold T1, then control goes to step S610.

In step S610, the main ECU 20 controls the second front clutch solenoid 106 to engage the front clutch 38b on the output end of the belt-and-pulley mechanism 36, transmitting the drive power from the engine 14 to the front wheels 26a. At this time, because the engine 14 is rotating at a rotational speed that is substantially equal to the threshold T1, it has a inertia of rotational energy, therefore its rotational speed will not abruptly change even when some kind of impact from the road is imposed on the hybrid vehicle.

In step S611, the main ECU 20 calculates the output of the second motor 18, and supplies the calculated output to the rear motor ECU 56. The output of the second motor 18 is calculated as a value produced by subtracting the output of the engine 14 from the target drive power F.

In step S612, the main ECU 20 confirms the output value of the second motor 18. If the output value of the second motor 18 is substantially "0", then control goes to step S613. Otherwise, control goes to step S614.

In step S613, the main ECU 20 disengages the rear clutch 46. Then, control goes to step S602.

In step S614, i.e., when a mode change is being made from the second propulsion mode to the engine propulsion mode, the main ECU 20 sets the flags ENGSTPEV, IDSTPEV, and ENGDRV to "0".

Figure 14:
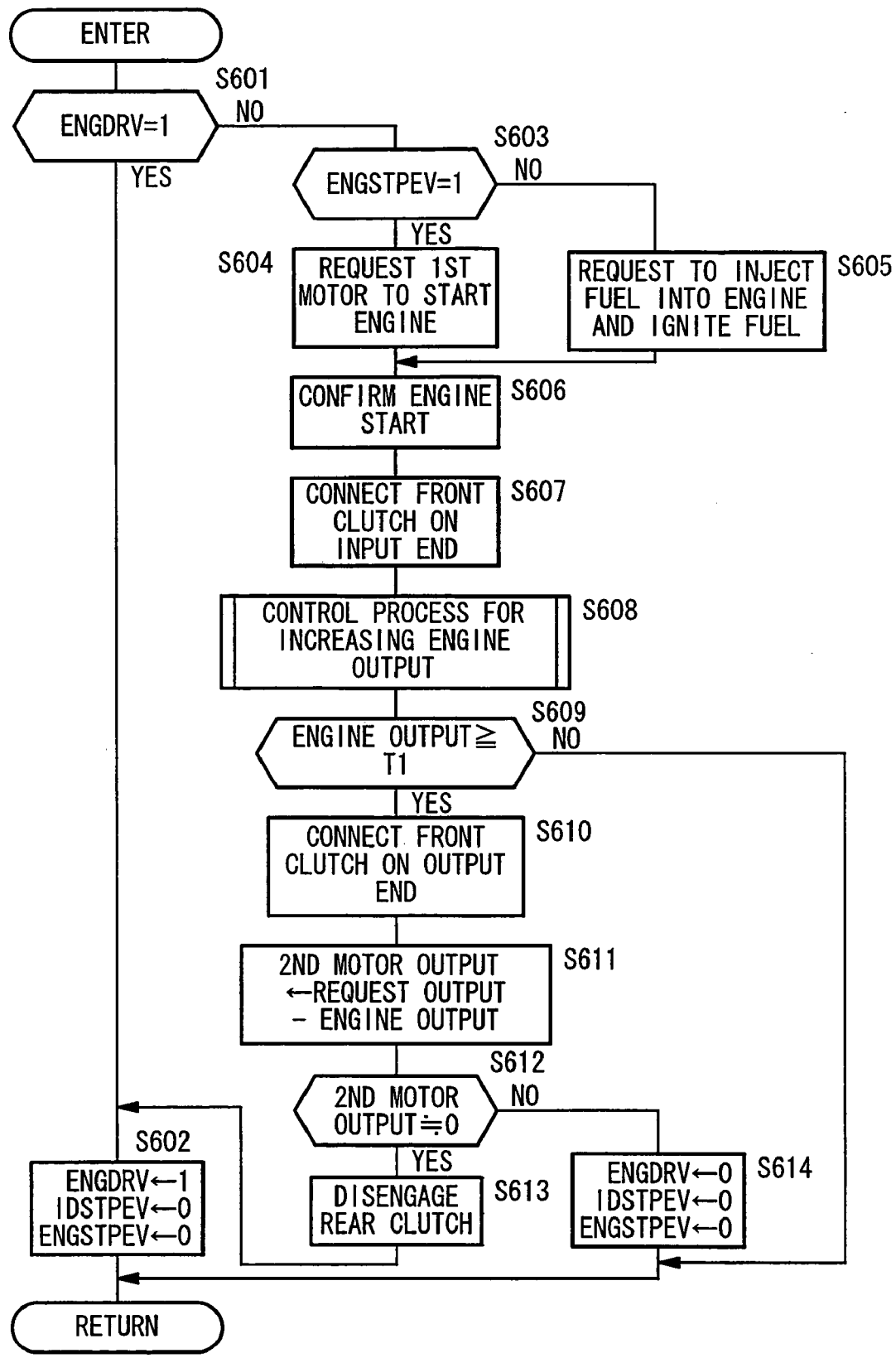
FIG. 14 is a flowchart of a processing sequence of the engine propulsion mode.

After the processing in steps S602, S614, the present cycle of the processing sequence shown in FIG. 14 is put to an end.

Figure 15:
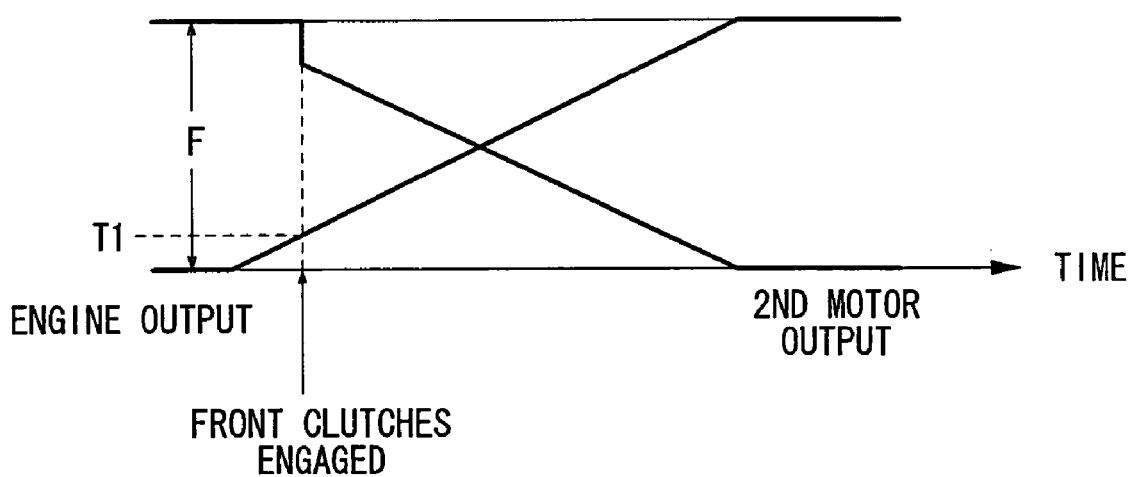
FIG. 15 is a timing chart showing how the output of the engine and the output of the second motor change when the EV mode changes to the engine propulsion mode.

In the processing from step S608 to step S613, the mode change from the first propulsion mode or the second propulsion mode to the engine propulsion mode can be made while the output of the engine 14 is gradually increased from substantially zero to the target drive power F. At this time, as shown in FIG. 15, since the front clutch 38b is engaged after the output of the engine 14 has reached the threshold T1, the rotational speed of the engine 14 is substantially equal to the threshold T1. Therefore, the engine 14 has an inertia of rotational energy, and its rotational speed will not abruptly change even when some kind of impact from the road is imposed on the hybrid vehicle. Thereafter, since the output of the second motor 18 is gradually increased as the output of the engine 14 rises for thereby equalizing the sum of the output of the engine 14 and the output of the second motor 18 to the target drive power F, the mode is changed smoothly without making the occupants of the hybrid vehicle 12 uncomfortable.

Alternatively, in step S612, a timer may be used so that the mode change is compulsorily completed after a predetermined time of the timer lapses.

As described above, with the drive control apparatus 10 for the hybrid vehicle 12 according to the present embodiment, the crankshaft of the engine 14 has been rotating at the idling speed by the first motor 16 when the second propulsion mode changes to the engine propulsion mode in response to a demand such as an acceleration demand. Consequently, there is almost no increase in the current consumed when the engine 14 starts to operate. In the EV mode, therefore, almost all electric power supplied from the battery 15 is used to energize the second motor 18, increasing the range in which the EV mode can perform, thus reducing consumption of the electric power stored in the battery 15, and reducing fuel consumption.

When the hybrid vehicle 12 is abruptly accelerated, the first propulsion mode may change directly to the engine propulsion mode bypassing the second propulsion mode. In this case, the engine 14 can reliably be started as the electric power Pf2 (see FIG. 5B) for starting the engine 4 is acquired.

In the first propulsion mode of the EV mode, because the first motor 16 is de-energized, the power consumption of the battery 15 is further reduced.

In the engine propulsion mode, since the rear clutch 46 is disengaged, the second motor 18 does not present a resistive load, and the fuel consumption is improved.

For starting the engine 14, the first motor 16 that is supplied with the electric power from the high-voltage battery 15 is used. Accordingly, no conventional starter is required to start the engine 14. As the low-voltage battery 51b is not used to start the engine 14, the voltage of the 12-V power supply system does not drop. Therefore, the controllers such as the main ECU 20 are not adversely affected when the engine 14 is started.

Since the low-voltage battery 51b is charged by the battery 15 through the downverter 51a, no conventional alternator is required. As no starter and no alternator are necessary, the drive control apparatus 10 is relatively simple, lightweight, and inexpensive.

In the above embodiment, the modes are switched according to the first threshold M1 and the second threshold M2 based on the maximum electric power Pr that can be supplied to the second motor 18. For example, the modes may be switched based on the acceleration α achievable by the hybrid vehicle 12 with respect to the vehicle speed V.

Figure 16:
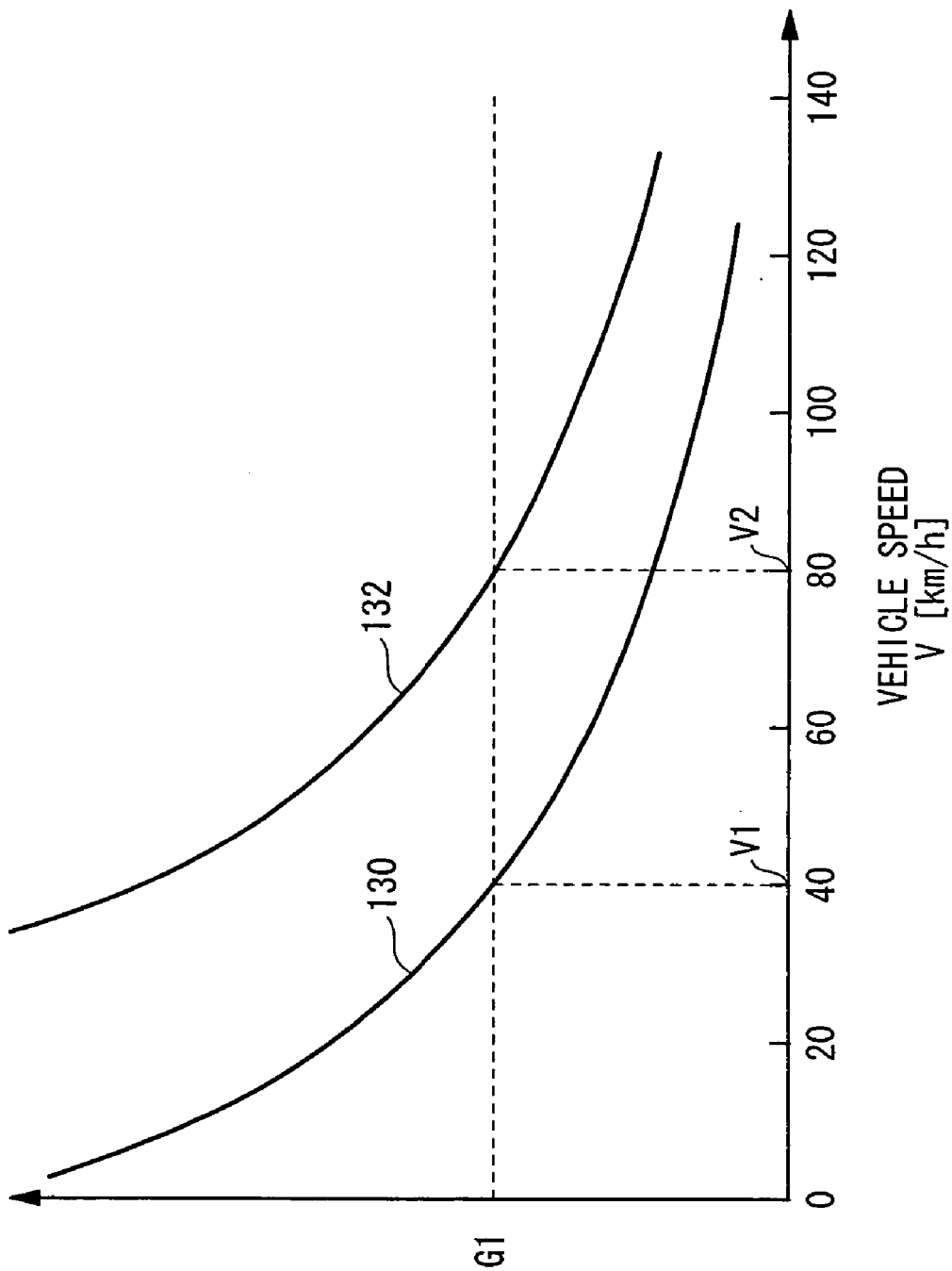
FIG. 16 is a diagram showing a map for determining upper limit vehicle speeds in the first propulsion mode and the second propulsion mode from an acceleration that can be achieved by the hybrid vehicle.

Specifically, as shown in FIG. 16, the relationship between different values of the vehicle speed V and different values of the acceleration α possible with the second motor 18 is represented by a map having a first acceleration curve 130 indicative of values of the acceleration α possible with the first propulsion mode, and a second acceleration curve 132 indicative of values of the acceleration α that can be achieved in the second propulsion mode. The first acceleration curve 130 represents an ability of the second motor 18 to accelerate the hybrid vehicle 12 based on the electric power Pr that is produced by subtracting the electric power Pf2 capable of starting the engine 14 from the electric power Pb (see FIG. 5B) of the battery 15 with respect to the SOC. The second acceleration curve 132 represents an ability of the second motor 18 to accelerate the hybrid vehicle 12 based on the electric power Pr that is produced by subtracting the electric power Pf1 (see FIG. 5A) capable of idly rotating the first motor 16 from the electric power Pb of the battery 15 with respect to the SOC.

Furthermore, an acceleration G1 (e.g., 0.5 [m/s²]) at which the hybrid vehicle 12 can be propelled without making the occupants uncomfortable is established on the map, and vehicle speeds V which correspond to the points where the acceleration G1 crosses the first acceleration curve 130 and the second acceleration curve 132 are determined. The vehicle speeds V thus determined serve as a first speed threshold V1 and a second speed threshold V2. In the map shown in FIG. 6, the first speed threshold V1 is 40 [km/h], and the second speed threshold V2 is 80 [km/h].

Figure 17:
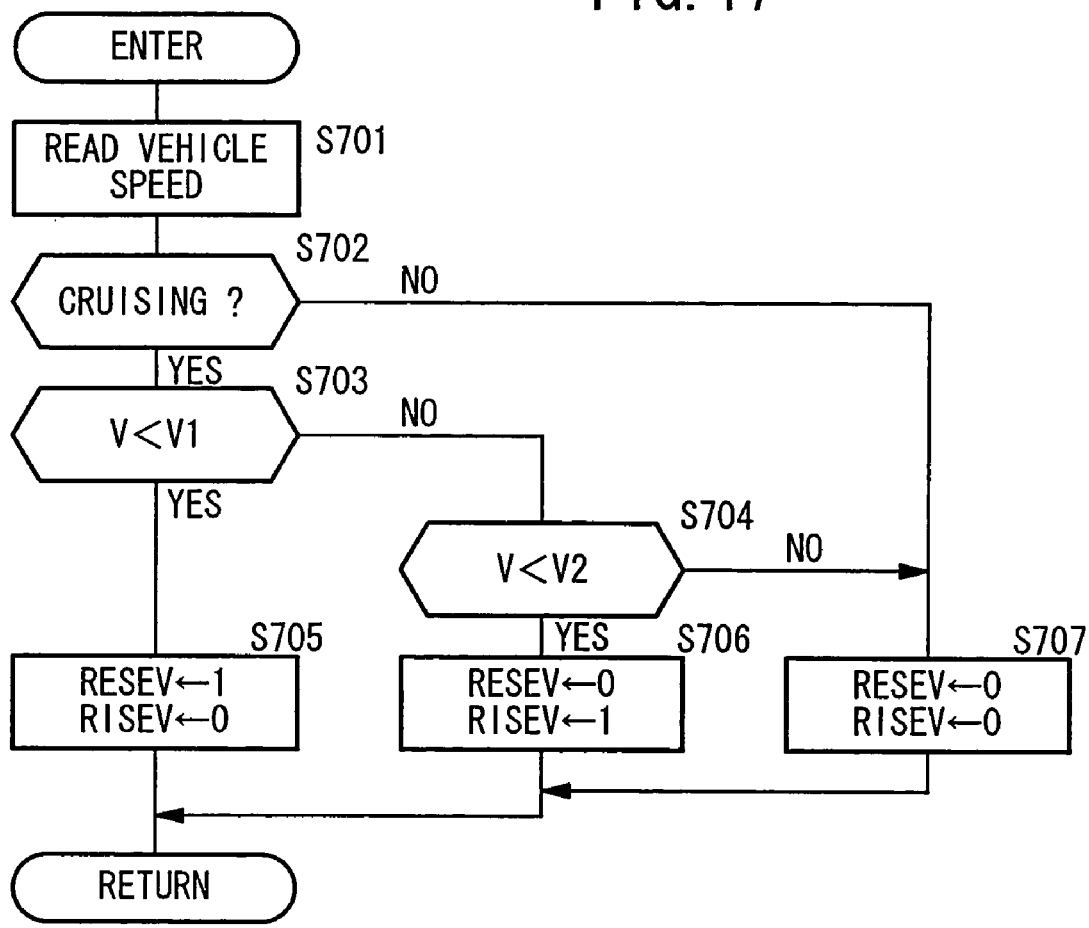
FIG. 17 is a flowchart of a processing sequence for determining an EV range based on a vehicle speed.

Specifically, the main ECU 20 performs a processing sequence shown in FIG. 17. The processing sequence shown in FIG. 17 corresponds to the processing in step S3 shown in FIG. 7 for determining an EV range in the above embodiment.

In step S701, the main ECU 20 reads values such as the vehicle speed V.

In step S702, the main ECU 20 makes a cruise control decision, i.e., determines whether the hybrid vehicle 12 is cruising (or running stably) or not. The decision is based on whether the changes in the vehicle speed V, the acceleration α, and the accelerator pedal displacement AP fall in predetermined ranges or not. These parameters may be smoothed by a moving average, if necessary, to determine whether the hybrid vehicle 12 is cruising or not. If the hybrid vehicle 12 is cruising, then control goes to step S703. If the hybrid vehicle 12 is not cruising, then control goes to step S707.

In step S703, the main ECU 20 compares the vehicle speed V with the first speed threshold V1. If the vehicle speed V is smaller than the first speed threshold V1, then control goes to step S705. If the vehicle speed V is equal to or greater than the first speed threshold V1, then control goes to step S704.

In step S704, the main ECU 20 compares the vehicle speed V with the second speed threshold V2. If the vehicle speed V is smaller than the second speed threshold V2, then control goes to step S706. If the vehicle speed V is equal to or greater than the second speed threshold V2, then control goes to step S707.

In step S705, i.e., when the first propulsion mode is to be performed, the main ECU 20 sets the flag RESEV indicating the first propulsion mode to "1", and sets the flag RISEV indicating the second propulsion mode to "0".

In step S706, i.e., when the second propulsion mode is to be performed, the main ECU 20 sets the flag RESEV to "0", and sets the flag RISEV to "1".

In step S707, i.e., when the engine propulsion mode is to be performed, the main ECU 20 sets the flags RESEV, RISEV to "0".

After step S705, S706, or S707, the processing sequence shown in FIG. 17 is put to an end.

Since the first propulsion mode, the second propulsion mode, and the engine propulsion mode are switched based on the first speed threshold V1 and the second speed threshold V2 which allow the hybrid vehicle 12 to achieve the acceleration G1, the modes can smoothly be switched without decelerating.

In steps S703, S704, mode switching is determined based on the vehicle speed V. However, mode switching may be determined based on the rotational speed of the second motor 18, rather than the vehicle speed V. According to such a modification, appropriate mode switching can be accomplished without being affected by the vehicle speed V even if the ratio of gears coupled to the second mode 18 is changed. That is, this modification is applicable to a situation where the speed reduction ratio of the two-speed-switching gear mechanism 51 is changed by the rear clutch 46a shown in FIG. 2.

In the above embodiment, only the rear wheels 26b are driven in the first propulsion mode and the second propulsion mode, and only the front wheels 26a are driven in the engine propulsion mode. However, all the four wheels may be driven depending on the conditions in which the hybrid vehicle 12 runs, e.g., when the hybrid vehicle 12 runs on snowy terrain.

Although certain preferred embodiments of the present invention have been shown and described in detail, it should be understood that various changes and modifications may be made therein without departing from the scope of the appended claims.

What is claimed is:

1. A drive control apparatus for a hybrid vehicle, comprising:
   a first motor coupled to a rotational shaft of an engine;
   a first drive wheel for receiving drive power from said rotational shaft through first clutches;
   a second motor;
   a second drive wheel for receiving drive power from said second motor;
   a first battery for supplying electric power to said first motor and said second motor; and
   a controller for controlling said first motor, said second motor, said first clutches, and said engine;
   wherein said controller controls an electric vehicle mode in which said first clutches are disengaged, the supply of fuel to said engine is stopped, and said second motor drives said second drive wheel to propel the hybrid vehicle, and said electric vehicle mode is at least divided into a first propulsion mode and a second propulsion mode;
   said first propulsion mode is a mode in which said first motor is de-energized; and
   said second propulsion mode is a mode in which a load imposed on said second motor is greater than in said first propulsion mode, and said first motor is supplied with electric power to rotate said rotational shaft at a predetermined speed.

2. A drive control apparatus according to claim 1, wherein said controller switches between said first propulsion mode and said second propulsion mode based on drive power required to propel the hybrid vehicle, a vehicle speed, and a rotational speed and/or a torque of said second motor.

3. A drive control apparatus according to claim 1, wherein said controller switches between said first propulsion mode and said second propulsion mode based on a state of charge of said first battery.

4. A drive control apparatus according to claim 1, wherein said controller switches between said first propulsion mode and said second propulsion mode when said hybrid vehicle is cruising.

5. A drive control apparatus according to claim 1, wherein said controller switches between said first propulsion mode and said second propulsion mode based on vehicle speeds which allow said hybrid vehicle to achieve a predetermined acceleration with the output of said second motor.

6. A drive control apparatus according to claim 1, wherein said controller switches between said first propulsion mode and said second propulsion mode based on a rotational speed of said second motor which allows said hybrid vehicle to achieve a predetermined acceleration with the output of said second motor.

7. A drive control apparatus according to claim 1, further comprising:
   a second clutch disposed between said second motor and said second drive wheel, for being controlled by said controller;
   wherein said controller switches to an engine propulsion mode in which said first clutches are engaged to transmit drive power of at least one of said engine and said first motor to said first drive wheel, said second clutch being disengaged and said second motor is de-energized in said engine propulsion mode.

8. A drive control apparatus according to claim 7, wherein when said engine propulsion mode changes to said electric vehicle mode,
   said controller equalizes the sum of the drive power transmitted to said first drive wheel and the drive power transmitted to said second drive wheel to drive power required to propel the hybrid vehicle, and gradually changes each of the drive power transmitted to said first drive wheel and the drive power transmitted to said second drive wheel.

9. A drive control apparatus according to claim 7, further comprising:
   a battery usage decision unit for determining whether said first battery is not usable;
   wherein said controller performs said engine propulsion mode if it is judged by said battery usage decision unit that said first battery is not usable.

10. A drive control apparatus according to claim 1, wherein when said electric vehicle mode changes to said engine propulsion mode,
    said controller equalizes the sum of the drive power transmitted to said first drive wheel and the drive power transmitted to said second drive wheel to drive power required to propel the hybrid vehicle, gradually changes each of the drive power transmitted to said first drive wheel and the drive power transmitted to said second drive wheel, and engages said first clutches when the output of said engine reaches a predetermined threshold after the engine has started.

11. A drive control apparatus according to claim 1, wherein said controller is supplied with electric power from a second battery whose voltage is lower than said first battery.

12. A drive control apparatus according to claim 1, wherein at least one cylinder of said engine is disabled in said second propulsion mode.

13. A drive control apparatus according to claim 1, wherein rotation of said second motor is reduced in speed by a gear mechanism and transmitted to said second drive wheel.

* * * * *